US012763616B2

(12) United States Patent
Yoshida et al.

(10) Patent No.: US 12,763,616 B2
(45) Date of Patent: Oct. 13, 2026

(54) STATOR CORE WITH STACKED CORE AND ADHESION PORTION

(71) Applicant: Mitsubishi Electric Corporation, Tokyo (JP)

(72) Inventors: Shinichiro Yoshida, Tokyo (JP); Fumitaka Totsuka, Tokyo (JP); Tatsuro Hino, Tokyo (JP); Masaki Shinohara, Tokyo (JP); Takafumi Ichida, Tokyo (JP); Satoru Sodeoka, Tokyo (JP); Ryosuke Kakuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 114 days.

(21) Appl. No.: 18/563,381

(22) PCT Filed: Jun. 1, 2021

(86) PCT No.: PCT/JP2021/020782

§ 371 (c)(1),
(2) Date: Nov. 22, 2023

(87) PCT Pub. No.: WO2022/254568

PCT Pub. Date: Dec. 8, 2022

(65) Prior Publication Data

US 2024/0275219 A1 Aug. 15, 2024

(51) Int. Cl.
*H02K 1/14* (2006.01)
*H02K 15/022* (2025.01)
*H02K 21/16* (2006.01)

(52) U.S. Cl.
CPC .......... *H02K 1/148* (2013.01); *H02K 15/022* (2013.01); *H02K 21/16* (2013.01)

(58) Field of Classification Search
CPC ............ H02K 1/14; H02K 1/146; H02K 1/16; H02K 1/08; H02K 1/06; H02K 15/02;
(Continued)

(56) References Cited

U.S. PATENT DOCUMENTS 1,538,196 A * 5/1925 Livingston ............... H02K 1/16
310/216.016
4,316,111 A * 2/1982 Merki .................. H02K 15/022
310/216.136

(Continued)

FOREIGN PATENT DOCUMENTS

JP 2003-324869 A 11/2003
JP 2004-266913 A 9/2004

(Continued)

OTHER PUBLICATIONS

English Translate_JP2019187056a.*

(Continued)

*Primary Examiner* — Maged M Almawri
(74) *Attorney, Agent, or Firm* — XSENSUS LLP

(57) ABSTRACT

A stacked core is formed by stacking, in an axial direction, a plurality of core pieces each having a core-back portion and a tooth portion. An adhesion portion is formed on the core pieces continuously or intermittently in the axial direction at a recess formed to extend in the axial direction on the core pieces on at least one of an end surface of an outer periphery of the tooth portion and an end surface of an outer periphery of the core-back portion of the stacked core.

20 Claims, 30 Drawing Sheets

(58) Field of Classification Search
CPC ............... H02K 15/022; H02K 15/026; H02K 2201/09; H02K 21/16; B32B 37/12
USPC ....... 310/216.004, 216.011–216.19, 216.059, 310/216.061, 216.062, 216.064, 216.065, 310/216.071, 216.073, 216.092, 216.096
See application file for complete search history.

(56) References Cited

U.S. PATENT DOCUMENTS 4,616,151 A * 10/1986 Pryjmak .................. H02K 1/26 310/216.096
4,700,098 A * 10/1987 Kawashima ........... H02K 21/22 310/156.45
4,847,526 A * 7/1989 Takehara ............... H02K 23/40 310/154.25
5,107,159 A * 4/1992 Kordik ................... H02K 1/146 318/400.29
5,142,178 A * 8/1992 Kloster ................ H02K 15/021 310/216.048
5,331,245 A * 7/1994 Burgbacher ........... H02K 29/03 310/216.057
5,338,996 A * 8/1994 Yamamoto ............... H02K 1/26 336/234
5,448,119 A * 9/1995 Kono ....................... H02K 7/14 310/90
5,477,096 A * 12/1995 Sakashita ................. H02K 1/06 310/216.016
5,778,703 A * 7/1998 Imai ........................ D06F 34/10 68/12.02
5,986,377 A * 11/1999 Yamada ............... H02K 15/022 310/216.013
6,242,835 B1 * 6/2001 Uemura ................. H02K 3/493 310/214
6,424,073 B1 * 7/2002 Kometani ................ H02K 1/16 310/263
6,433,456 B1 * 8/2002 Higashino ................ H02K 1/16 310/263
6,495,936 B2 * 12/2002 Kikuchi ................. H02K 9/197 310/58
6,653,758 B2 * 11/2003 Tsuneyoshi ............ H02K 9/197 310/216.014
6,774,520 B2 * 8/2004 Wauke ..................... H02K 7/09 310/40 MM
6,885,127 B1 * 4/2005 Higashino .......... H02K 15/0433 310/263
6,919,663 B2 * 7/2005 Iles-Klumpner ....... H02K 1/276 310/156.01
7,859,163 B2 * 12/2010 Bertocchi ........... H01F 41/0233 310/216.048
7,952,254 B2 * 5/2011 Cho ....................... H02K 3/345 310/216.118
8,274,182 B2 * 9/2012 Nakayama ............. H02K 41/03 310/216.096
8,581,468 B2 * 11/2013 Kudose .................... H02K 1/16 310/216.049
8,847,460 B2 * 9/2014 Jurkovic ................ H02K 29/03 310/216.096
8,887,376 B2 * 11/2014 Gerster ................. H01F 41/024 29/598
9,331,530 B2 * 5/2016 Jang ....................... H02K 1/146
9,685,264 B2 * 6/2017 Neuenschwander .. H02K 1/165
10,020,701 B2 * 7/2018 Kamiyoshihara ...... H02K 1/278
10,348,170 B2 * 7/2019 Izumi ..................... H02K 15/02
10,491,059 B2 * 11/2019 Murakami ............. H02K 1/185
10,547,225 B2 * 1/2020 Hattori ................... H02K 1/185
10,574,112 B2 * 2/2020 Tomonaga ............... H02K 1/02
10,819,201 B2 * 10/2020 Thumm ............... H02K 15/023
10,840,749 B2 * 11/2020 Chaillou .................. H02K 3/12
11,056,934 B2 * 7/2021 Kubota .................. H02K 1/165
11,261,513 B2 * 3/2022 Volbers ..................... H01F 1/16
11,616,407 B2 * 3/2023 Hino .................... H02K 15/064 310/216.007
11,652,374 B2 * 5/2023 Taniguchi .............. H02K 1/148 310/44
11,705,625 B2 * 7/2023 Tezuka ................. H01Q 1/2283 343/700 R
11,973,369 B2 * 4/2024 Fujimura ................. H02K 1/12
12,191,709 B2 * 1/2025 Kinoshita .............. H02K 1/148
12,407,199 B2 * 9/2025 Volbers ............... H01F 41/0233
2002/0047459 A1 * 4/2002 Adaeda ................ H02K 21/222 310/216.048
2002/0075121 A1 * 6/2002 Akita ..................... H02K 1/148 336/234
2002/0145359 A1 * 10/2002 Nishiyama ........... H02K 15/022 310/216.065
2002/0175586 A1 * 11/2002 Hill ...................... H02K 19/103 310/179
2004/0056556 A1 * 3/2004 Fujita .................. H02K 15/022 29/609
2004/0124733 A1 * 7/2004 Yamamoto ............. B29C 70/72 29/596
2005/0067915 A1 3/2005 Ida et al.
2006/0043820 A1 * 3/2006 Nakahara ................. H02K 1/02 310/254.1
2007/0018529 A1 * 1/2007 Naitou ................... A61G 5/045 310/43
2007/0040467 A1 * 2/2007 Gu ......................... H02K 3/522 310/260
2007/0182268 A1 * 8/2007 Hashiba ................. H02K 1/146 310/67 R
2009/0026873 A1 * 1/2009 Matsuo ................ H02K 15/022 310/216.019
2009/0230812 A1 * 9/2009 Cho ....................... H02K 3/325 310/216.118
2010/0045120 A1 * 2/2010 Kitano .................... B22F 1/102 252/62.51 R
2010/0090560 A1 * 4/2010 Myojin .................. H02K 15/02 310/216.043
2010/0127593 A1 * 5/2010 Qin ........................ H02K 1/265 310/216.112
2010/0219714 A1 * 9/2010 Abe ....................... H02K 1/146 310/216.048
2010/0244617 A1 * 9/2010 Nobata .................... H02K 3/50 310/216.069
2011/0037338 A1 * 2/2011 Leiber .................. H02K 15/022 310/216.105
2011/0169369 A1 * 7/2011 Liang ....................... H02K 1/16 310/216.092
2014/0070999 A1 * 3/2014 Kaneda ................... H01L 24/14 257/E21.705
2014/0084742 A1 * 3/2014 Gudewer ................. H02K 1/08 310/216.091
2014/0167894 A1 * 6/2014 Jajtic ........................ H02K 1/02 335/297
2015/0256035 A1 9/2015 Kudose et al.
2015/0256037 A1 * 9/2015 Kudose .................... H02K 3/30 310/45
2016/0023447 A1 * 1/2016 Shimizu ................. H02K 15/02 156/247
2016/0352165 A1 * 12/2016 Fubuki ..................... H02K 1/22
2017/0346351 A1 * 11/2017 Volbers .................... H02K 1/02
2018/0026501 A1 * 1/2018 Ogikubo .............. H02K 15/022 29/596
2018/0056629 A1 * 3/2018 Hamamura ............ H02K 1/185
2018/0166951 A1 * 6/2018 Ronning .................. H02K 3/18
2018/0212482 A1 * 7/2018 Nigo ......................... H02K 7/14
2019/0010361 A1 * 1/2019 Hoshi .................... C09J 163/00
2019/0181731 A1 * 6/2019 Yoshinaga ............... H02K 1/02
2020/0112210 A1 * 4/2020 Zhu ...................... H02K 1/2766
2020/0161944 A1 * 5/2020 Das ........................ H02K 1/146
2020/0186014 A1 * 6/2020 Kusuyama ................. C09J 4/00
2020/0381962 A1 * 12/2020 Georgiou ................. H02K 1/16
2021/0091611 A1 * 3/2021 Volbers .................... H02K 3/18
2021/0296975 A1 * 9/2021 Hino ...................... H02K 15/02
2021/0351658 A1 * 11/2021 Jore ....................... H02K 5/203
2021/0399594 A1 * 12/2021 Fujimura .................. H01F 3/02
2022/0006334 A1 * 1/2022 Wakisaka ................. H02K 1/06

(56) References Cited

U.S. PATENT DOCUMENTS

| | | | | |
|---|---|---|---|---|
| 2022/0028608 | A1* | 1/2022 | Kamikawabata | H01F 3/02 |
| 2022/0045582 | A1* | 2/2022 | Hunstable | H02K 15/08 |
| 2022/0209611 | A1 | 6/2022 | Kinashi et al. | |

FOREIGN PATENT DOCUMENTS

| | | | |
|---|---|---|---|
| JP | 2005-210817 | A | 8/2005 |
| JP | 2009-225558 | A | 10/2009 |
| JP | 2012-120299 | A | 6/2012 |
| JP | 2015-136228 | A | 7/2015 |
| JP | 2015-171201 | A | 9/2015 |
| JP | 2019-187056 | A | 10/2019 |
| JP | 2020-092531 | A | 6/2020 |
| JP | 2020-188541 | A | 11/2020 |
| JP | 7418216 | B2 | 1/2024 |

OTHER PUBLICATIONS

Korean Office Action dated Sep. 27, 2024, of the corresponding Korean patent application No. KR10-2023-7034434, 19pp.

Notice of Reasons for Refusal mailed on Aug. 16, 2023, received for JP Application 2020-000126, 8 pages including English Translation.

International Search Report and Written Opinion mailed on Aug. 17, 2021, received for PCT Application PCT/JP2021/020782, filed on Jun. 1, 2021, 10 pages including English Translation.

Japanese Office Action dated Mar. 12, 2024, issued in the corresponding Japanese patent application No. JP2023-525207, 11pp.

Indian examination report dated Oct. 15, 2025 of the corresponding Indian patent application No. IN202347064549, 6pp.

* cited by examiner

STATOR CORE WITH STACKED CORE AND ADHESION PORTION

CROSS-REFERENCE TO RELATED APPLICATION

This application is based on PCT filing PCT/JP2021/020782, filed Jun. 1, 2021, the entire contents of which are incorporated herein by reference.

TECHNICAL FIELD

The present disclosure relates to a stator core of a rotating electric machine, a stator of a rotating electric machine, a rotating electric machine, a method for manufacturing a stator core of a rotating electric machine, and a method for manufacturing a rotating electric machine.

BACKGROUND ART

In recent years, rotating electric machines such as an electric motor and an electric generator have been required to have a small size and a high output. It is widely known that an armature core used in a rotating electric machine is formed by a stacked core composed of stacked electromagnetic steel sheets, thus reducing eddy current generated in the armature core and enhancing efficiency. As means for fixing the stacked electromagnetic steel sheets, there is a method of swaging or welding the electromagnetic steel sheets with each other, but in this method, the electromagnetic steel sheets are electrically short-circuited in the stacking direction at their fixation parts, so that eddy current is generated and efficiency is deteriorated.

In addition, residual stress arises at the swaged or welded parts, so that hysteresis loss increases and efficiency of the rotating electric machine is deteriorated. As a method for solving the above problems, there is known a method of fixing electromagnetic steel sheets by adhesion (see, for example, Patent Document 1). For example, in a stacked core manufacturing method described in Patent Document 1, it is proposed that, in a state in which multiple electromagnetic steel sheets are stacked and the stacked core is tightened and fixed, an adhesive of a thermosetting type is permeated between the electromagnetic steel sheets so that the adhesive permeates to an outer periphery of the core, an inner periphery of the core, and the inside of the core, and is cured, to fix the core, thus obtaining an electric motor.

CITATION LIST

Patent Document

Patent Document 1: Japanese Laid-Open Patent Publication No. 2003-324869

SUMMARY OF THE INVENTION

PROBLEM TO BE SOLVED BY THE INVENTION

Conventionally, in such a stator core of a rotating electric machine, a stator of a rotating electric machine, a rotating electric machine, a method for manufacturing a stator core of a rotating electric machine, and a method for manufacturing a rotating electric machine, since an adhesive adheres to an outer peripheral surface of a stacked core, there is a problem that core shape accuracy after assembly is reduced due to the adhesive on the outer peripheral surface in a case where an attachment frame is shrink-fitted or press-fitted to the outer circumference of the core. In addition, in a case where side surfaces of stacked cores divided in the circumferential direction on a plane perpendicular to the axial direction are brought into contact with each other and the stacked cores are arranged in an annular shape to assemble an armature core, assembly accuracy is unstable due to an adhesive adhered to the contact surfaces of the stacked cores, thus having a problem of reducing shape accuracy.

In addition, it is necessary to provide an adhesive into all areas between the electromagnetic steel sheets composing the stacked core, and therefore, considering that the number of stacked electromagnetic steel sheets of a general stacked core used in a rotating electric machine or the like reaches several hundreds, it is necessary to permeate an adhesive into all areas between the electromagnetic steel sheets at several hundreds of locations, thus having a problem of reducing productivity.

The present disclosure has been made to solve the above problem, and an object of the present disclosure is to provide a stator core of a rotating electric machine, a stator of a rotating electric machine, a rotating electric machine, a method for manufacturing a stator core of a rotating electric machine, and a method for manufacturing a rotating electric machine, for which reduction in assembly accuracy and productivity is prevented even in a case of using an adhesive.

Means to Solve the Problem

A stator core of a rotating electric machine according to the present disclosure is a stacked core formed by stacking, in an axial direction, a plurality of core pieces each having a core-back portion and a tooth portion protruding toward an inner side in a radial direction from a core-inner-circumferential surface on the inner side in the radial direction of the core-back portion. An adhesion portion is formed on the core pieces continuously or intermittently in the axial direction at a recess formed to extend in the axial direction on the core pieces on at least one of an end surface of an outer periphery of the tooth portion and an end surface of an outer periphery of the core-back portion of the stacked core.

A stator of a rotating electric machine according to the present disclosure is configured such that, in the stator core of the rotating electric machine described above, the adhesion portion is formed on all the core pieces continuously or intermittently in the axial direction on at least one of surfaces forming a slot area surrounded by the tooth portion and the core-back portion of the stacked core, an insulator is formed on the surfaces of the stacked core that form the slot area of the stator core of the rotating electric machine described above, the adhesion portion is formed between the insulator and the stacked core without being adhered to the insulator, and a coil is formed in the slot area with the insulator interposed.

A rotating electric machine according to the present disclosure includes: the stator of the rotating electric machine described above; and a rotor provided so as to be opposed to the stator with a gap therebetween.

A method for manufacturing a stator core of a rotating electric machine according to the present disclosure is a method for manufacturing the stator core of the rotating electric machine in which, on the core piece on one end side in the axial direction of the stacked core, a projection projecting toward the one end side in the axial direction is formed, the method including: a stamping step of sequentially stamping the core pieces from a sheet material while forming the projection for once every predetermined number of the core pieces of the stacked core; an alignment step of stacking and aligning the stamped core pieces in the axial direction; an application step of applying an adhesive at the recess on all the core pieces continuously or intermittently in the axial direction; a curing step of curing the adhesive; and a division step of dividing a plurality of the stacked cores adhered by the adhesive continuously in the axial direction, by cutting the adhesive at a position of the projection in the axial direction.

In a method for manufacturing a rotating electric machine according to the present disclosure, an insulator and a coil are provided to the stator core of the rotating electric machine manufactured by the method for manufacturing the stator core of the rotating electric machine described above, to form a stator, and a rotor is provided so as to be opposed to the stator with a gap therebetween.

Effect of the Invention

The stator core of the rotating electric machine, the stator of the rotating electric machine, the rotating electric machine, the method for manufacturing the stator core of the rotating electric machine, and the method for manufacturing the rotating electric machine according to the present disclosure make it possible to prevent reduction in assembly accuracy and productivity even in a case of using an adhesive.

DESCRIPTION OF EMBODIMENTS

Figure 1:
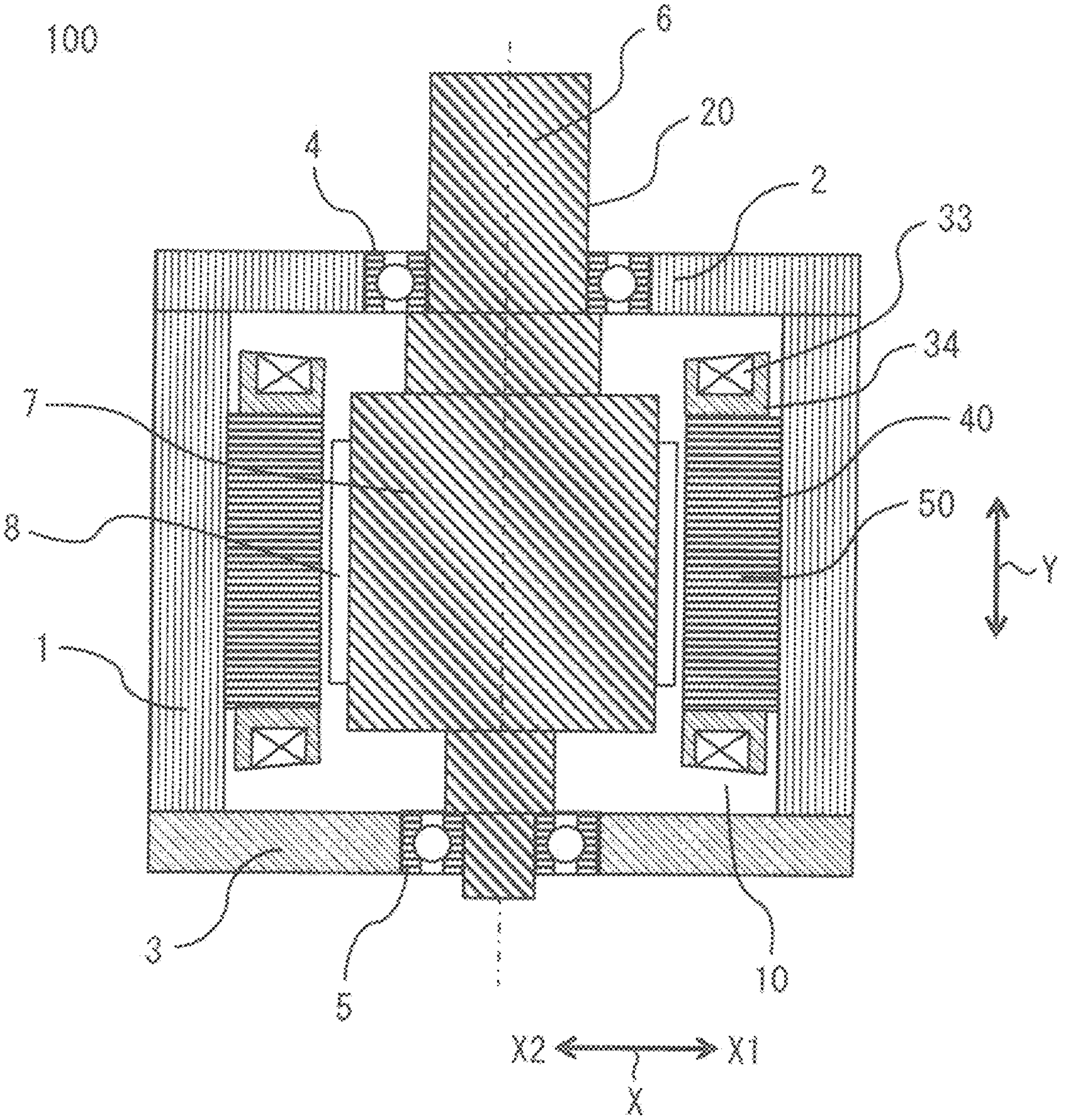
FIG. 1 is a sectional view showing a configuration of a rotating electric machine in embodiment 1.

In the following description, directions with respect to a rotating electric machine 100 are referred to as a circumferential direction 2, an axial direction Y, a radial direction X, an outer side X1 in the radial direction X, and an inner side X2 in the radial direction X. Therefore, these directions are applied in the same manner also in a stator 10, a rotor 20, and other parts, and various directions are indicated using the above directions as references, to give description. In embodiment 1, it is assumed that the stator is divided for each tooth portion in the circumferential direction 2, as an example. Therefore, one stator part divided in the circumferential direction 2 may be referred to as a stator in the same manner.

Embodiment 1

Figure 2:
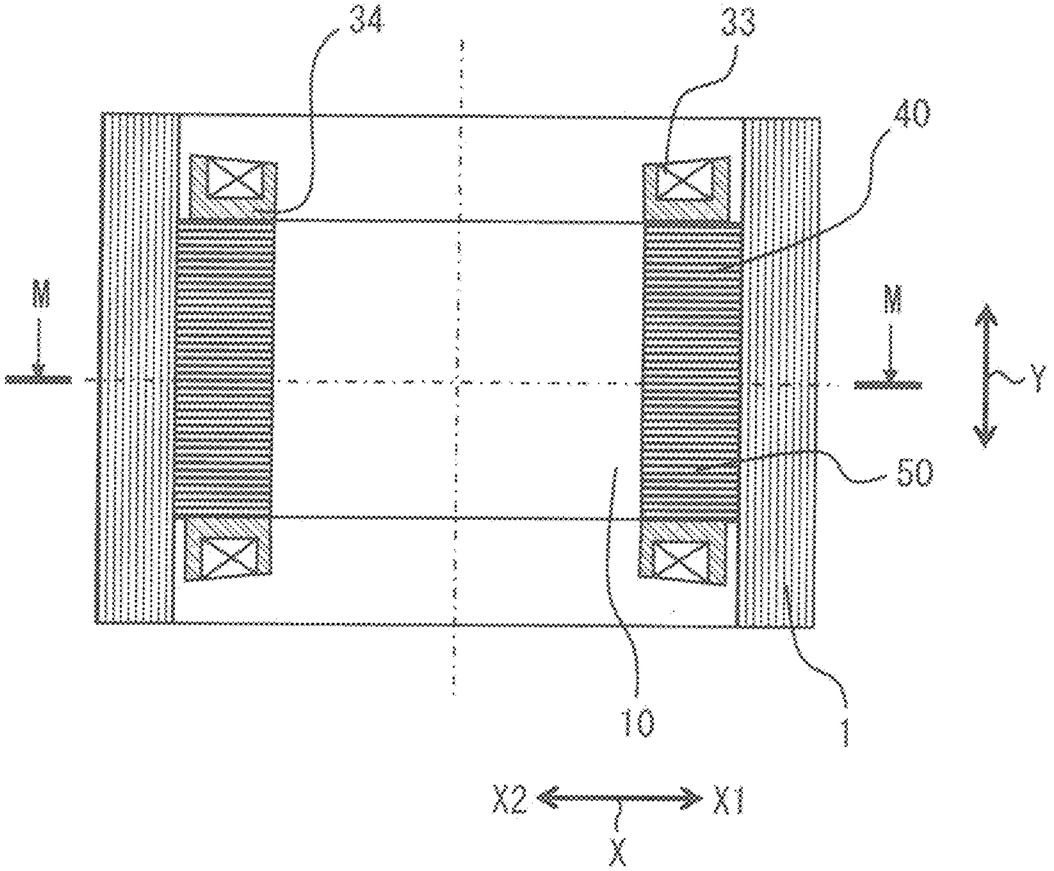
FIG. 2 is a sectional view showing a stator of the rotating electric machine shown in FIG. 1.
Figure 3:
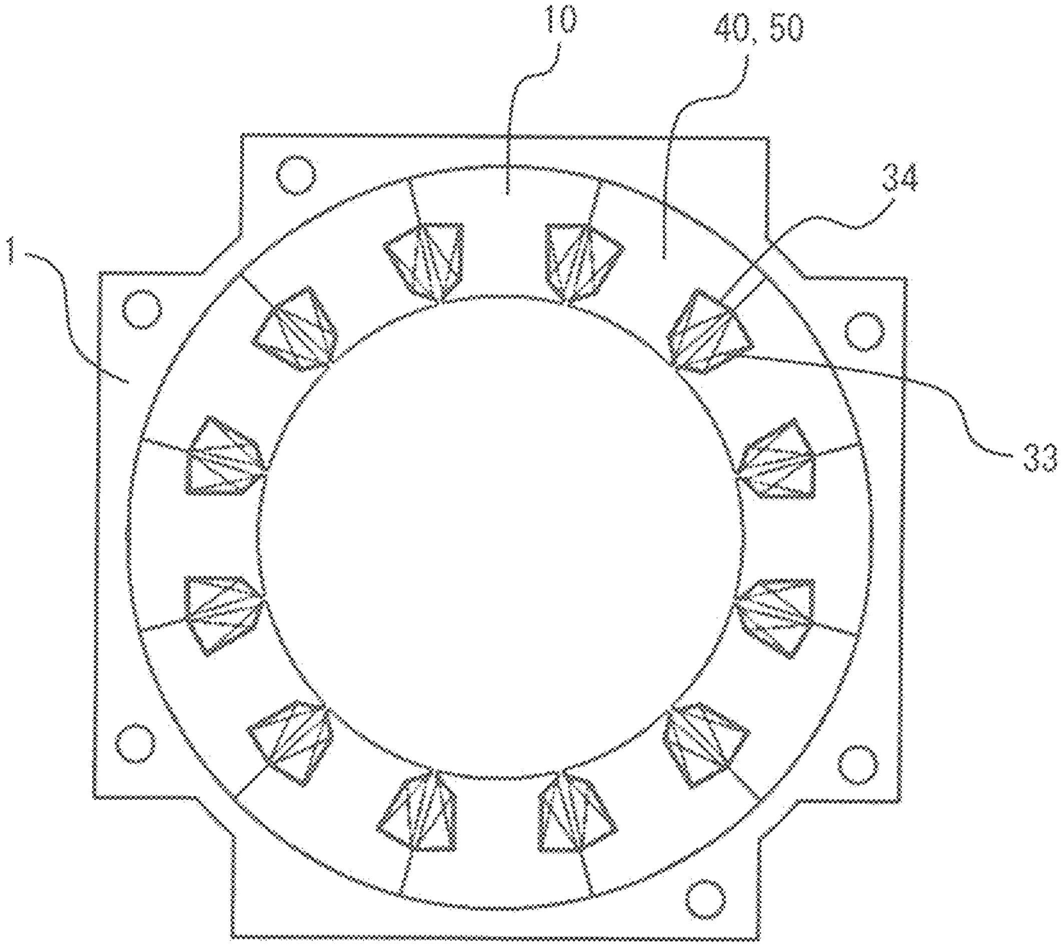
FIG. 3 is a sectional view of the stator shown in FIG. 2, along line M-M.
Figure 4:
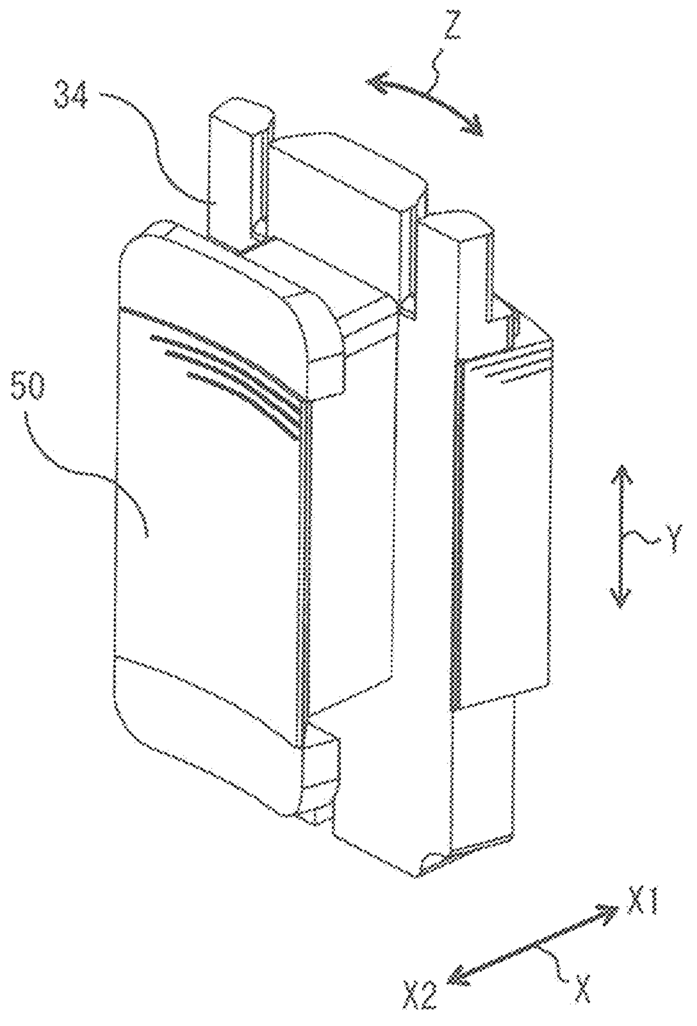
FIG. 4 is a perspective view showing a configuration of the stator of the rotating electric machine shown in FIG. 1 with an insulator provided, before a coil is provided.
Figure 5:
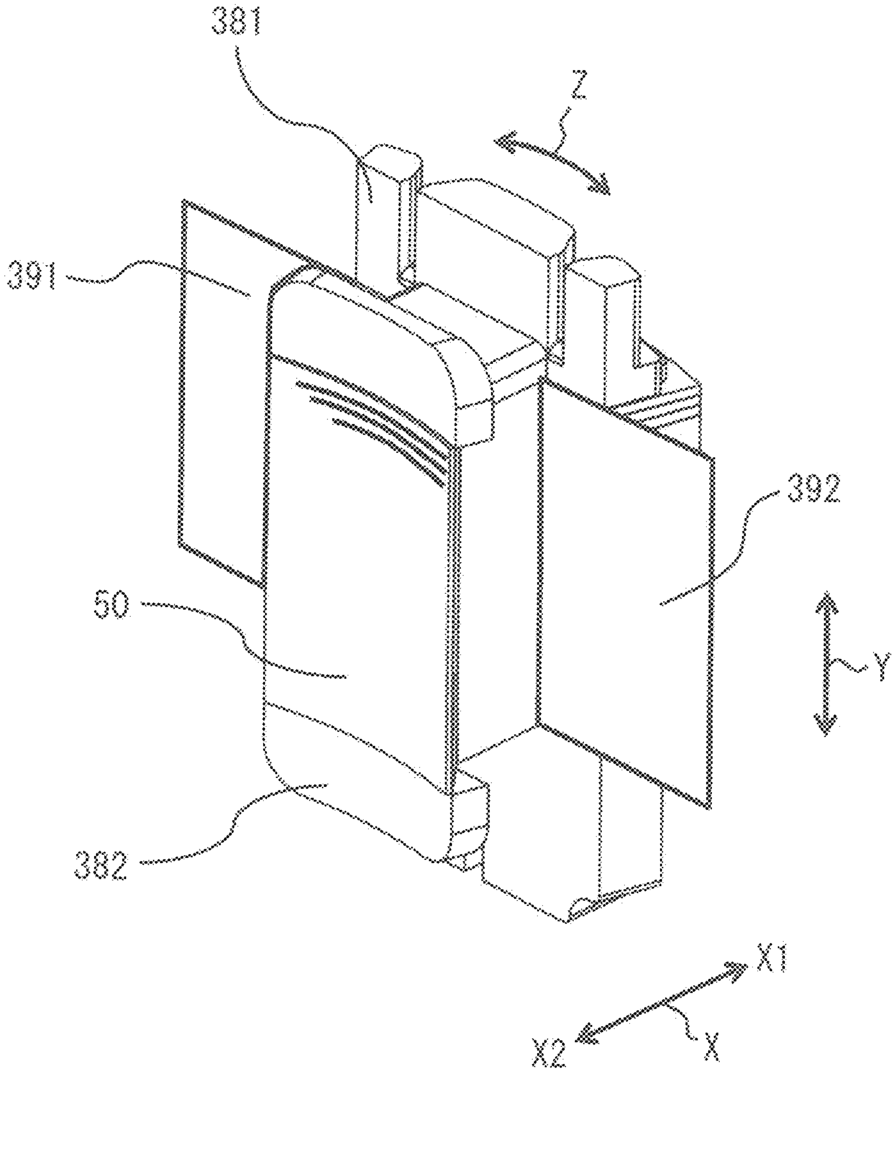
FIG. 5 is a perspective view showing another configuration of the stator of the rotating electric machine shown in FIG. 1 with an insulator provided, before a coil is provided.
Figure 6:
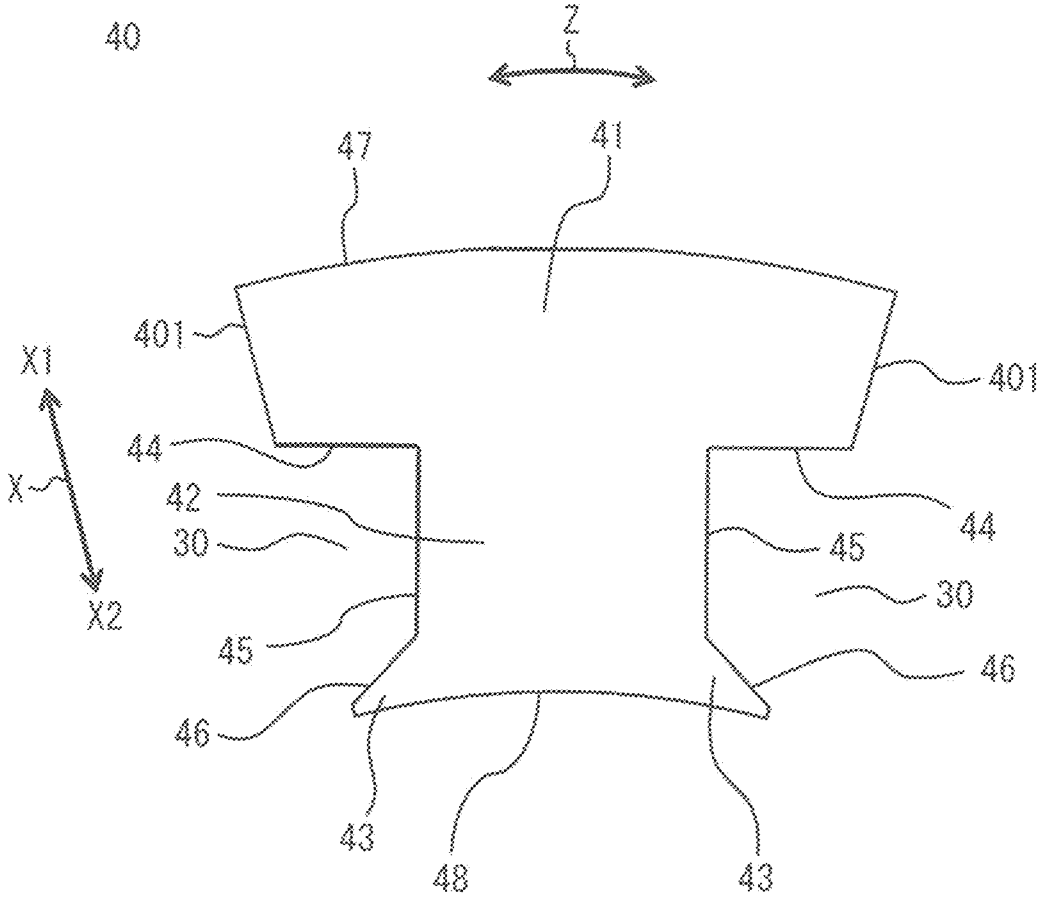
FIG. 6 is a plan view showing a core piece of the stator of the rotating electric machine shown in FIG. 1.
Figure 7:
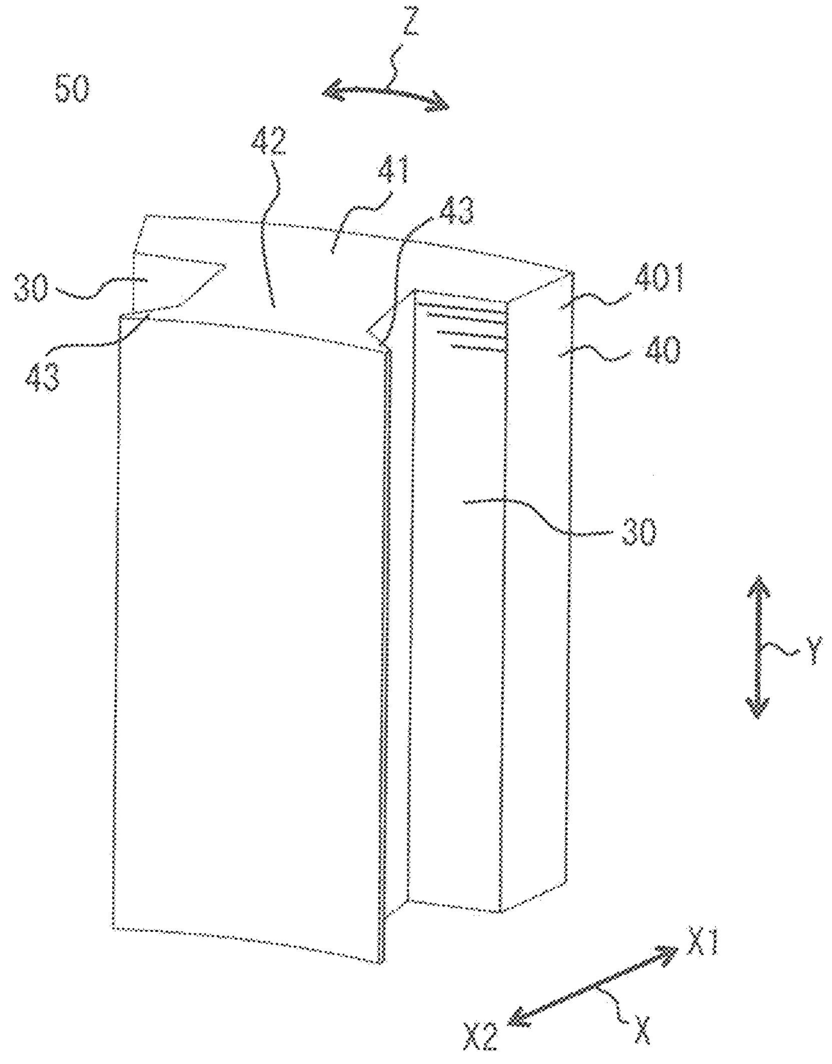
FIG. 7 is a perspective view showing a configuration of a stacked core of the stator of the rotating electric machine shown in FIG. 1.

FIG. 1 is a sectional view showing a configuration of the rotating electric machine in embodiment 1. FIG. 2 is a sectional view showing a configuration of the stator of the rotating electric machine shown in FIG. 1. FIG. 3 is a sectional view of the stator shown in FIG. 2 along line M-M. FIG. 4 is a perspective view showing a configuration of the stator of the rotating electric machine shown in FIG. 1 with an insulator provided, before a coil is provided. FIG. 5 is a perspective view showing another configuration of the stator of the rotating electric machine shown in FIG. 1 with an insulator provided, before a coil is provided. FIG. 6 is a plan view showing a configuration of a core piece of the stator of the rotating electric machine shown in FIG. 1. FIG. 7 is a perspective view showing a configuration of a stacked core of the stator of the rotating electric machine shown in FIG. 1.

Figure 8:
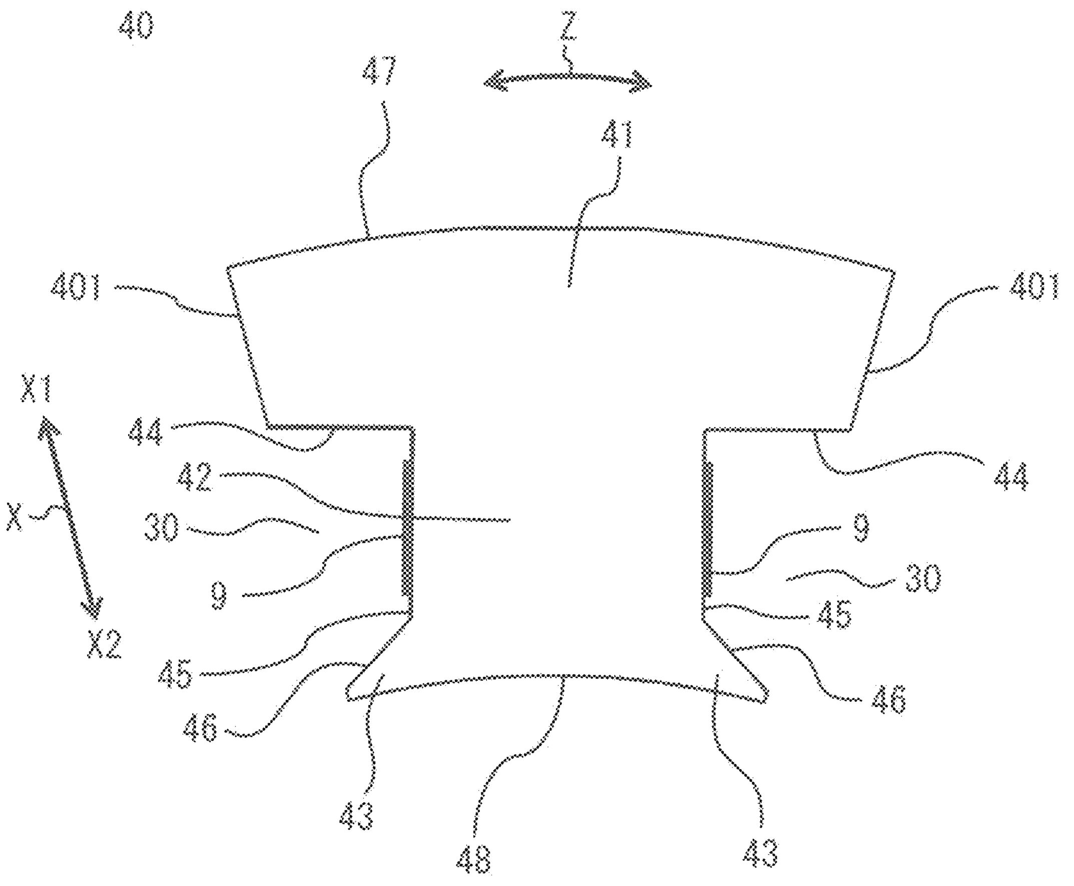
FIG. 8 is a plan view showing a state in which adhesion portions are formed on the core piece shown in FIG. 6.
Figure 9:
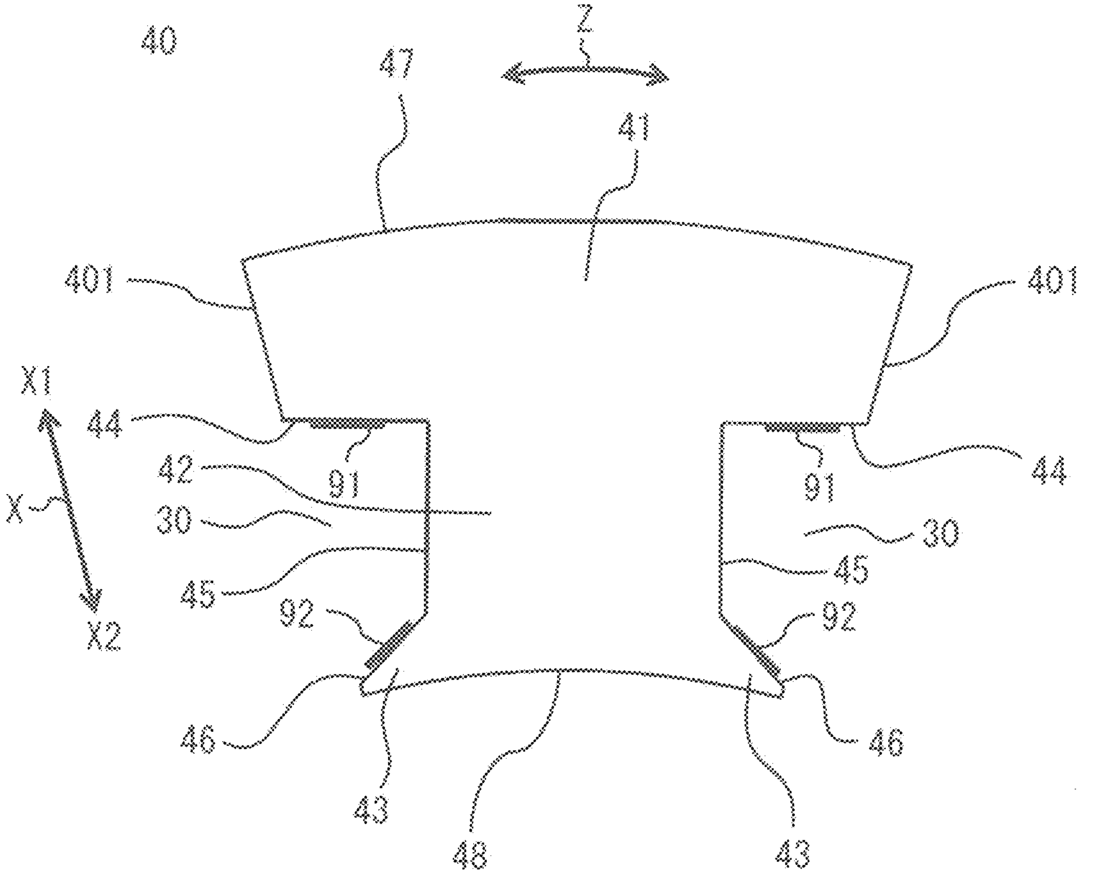
FIG. 9 is a plan view showing another state in which adhesion portions are formed on the core piece shown in FIG. 6.
Figure 11:
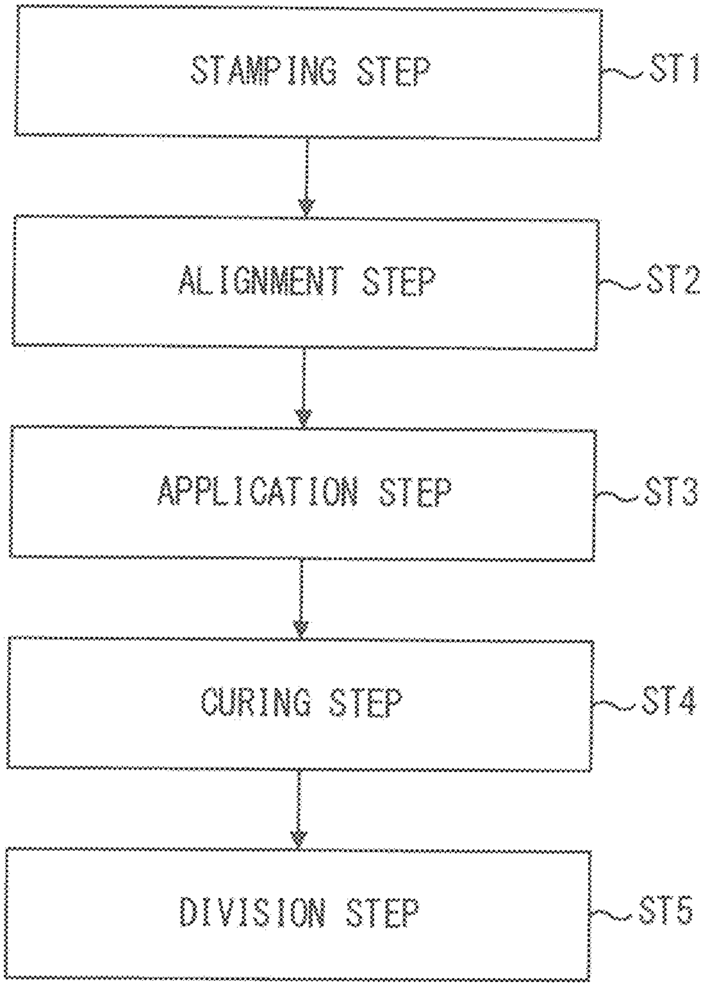
FIG. 11 is a flowchart showing a method for manufacturing the stacked core shown in FIG. 7.
Figure 12:
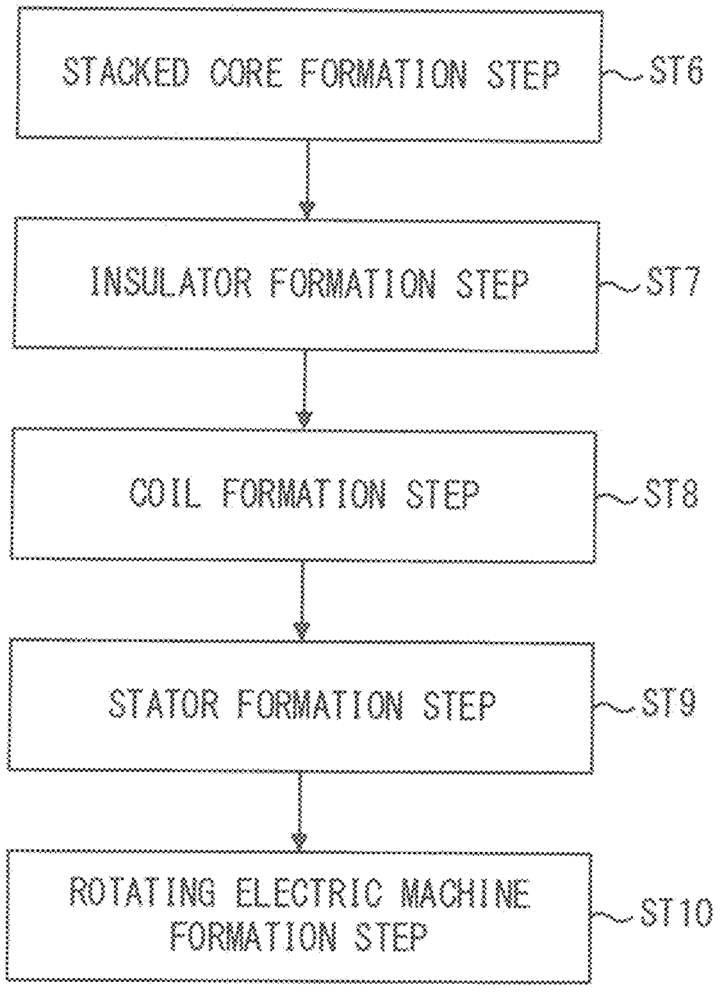
FIG. 12 is a flowchart showing a method for manufacturing the rotating electric machine in embodiment 1.
Figure 13:
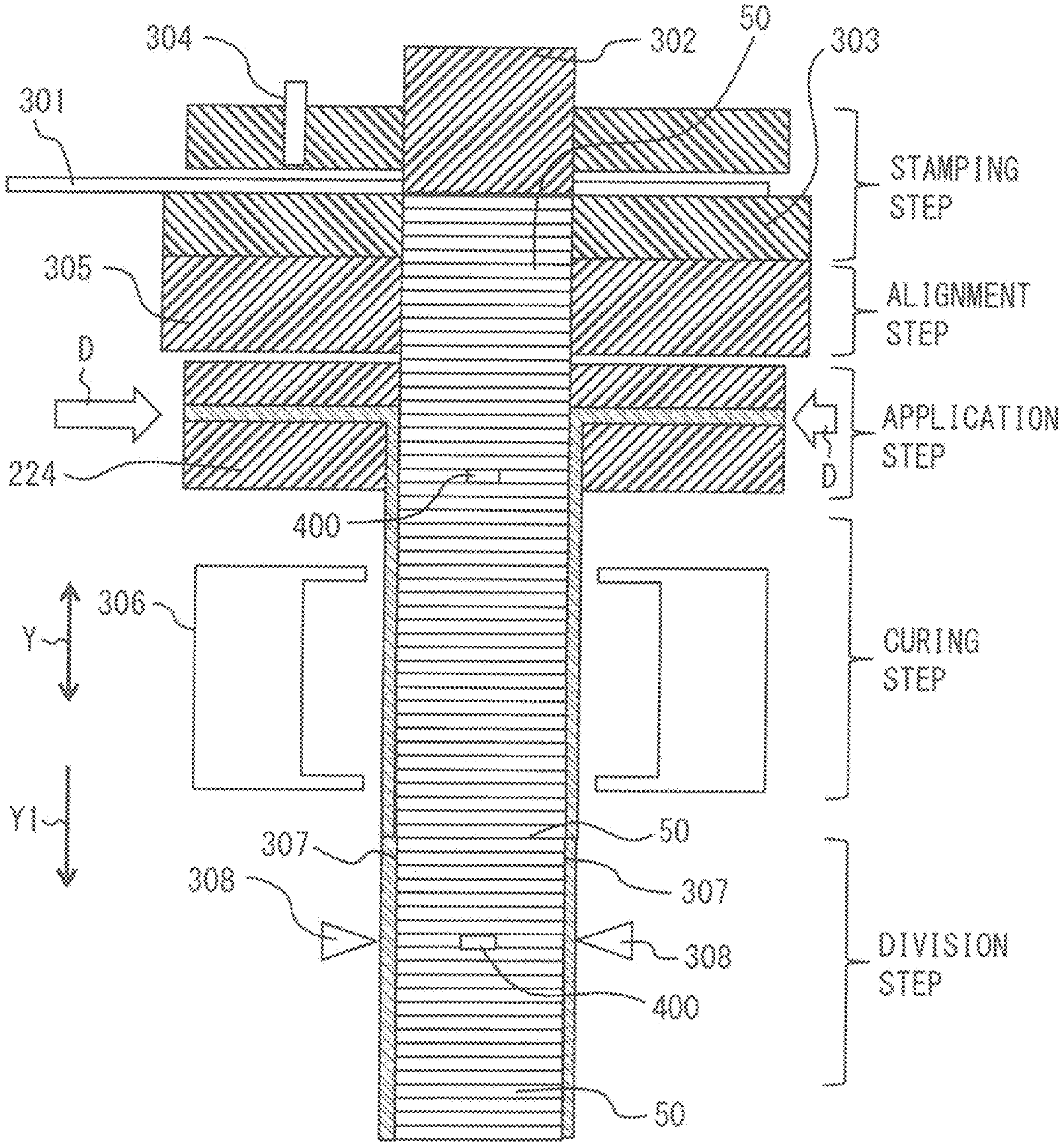
FIG. 13 shows the method for manufacturing the stacked core in embodiment 1.
Figure 14:
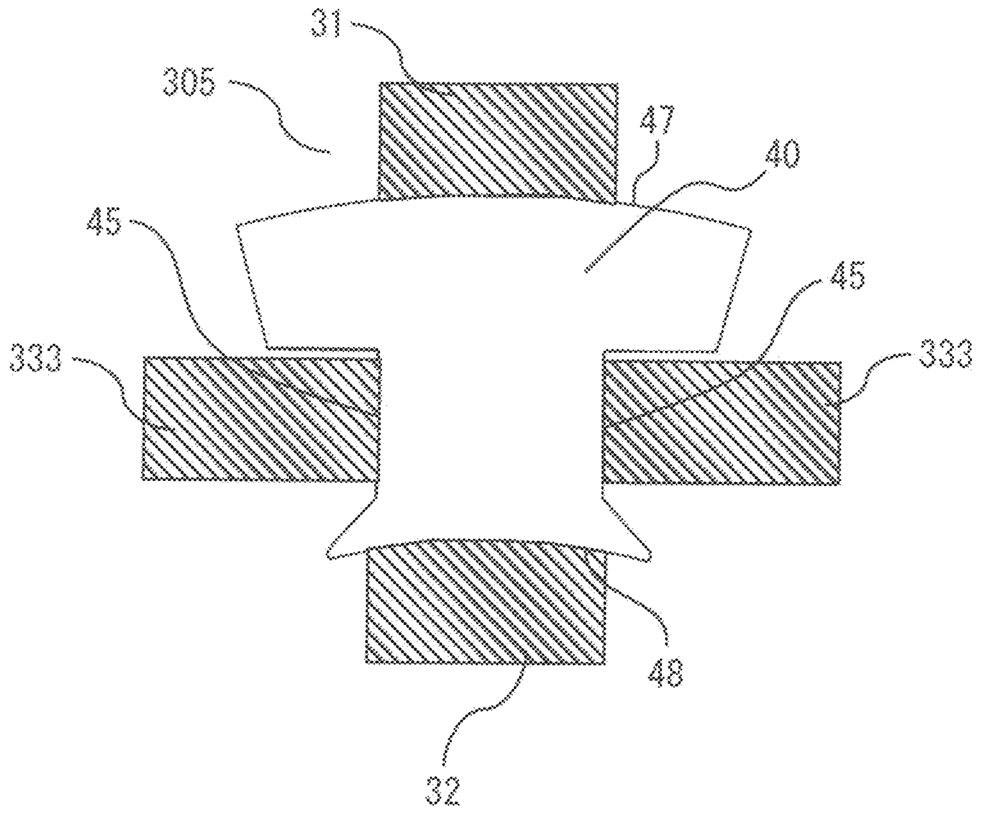
FIG. 14 is a plan view showing a configuration of an alignment guide in an alignment step of the method for manufacturing the stacked core shown in FIG. 13.

FIG. 8 is a plan view showing a state in which adhesion portions are formed on the core piece shown in FIG. 6. FIG. 9 is a plan view showing another state in which adhesion portions are formed on the core piece shown in FIG. 6. FIG. 10, FIG. 28, FIG. 29, and FIG. 30 are plan views showing states in which adhesion portions are formed in modifications of the core piece shown in FIG. 6. FIG. 11 is a flowchart showing a method for manufacturing the stacked core shown in FIG. 7. FIG. 12 is a flowchart showing a method for manufacturing the rotating electric machine in embodiment 1. FIG. 13 shows the method for manufacturing the stacked core in embodiment 1. FIG. 14 is a plan view showing a configuration of an alignment guide in an alignment step of the method for manufacturing the stacked core shown in FIG. 13.

Figure 15:
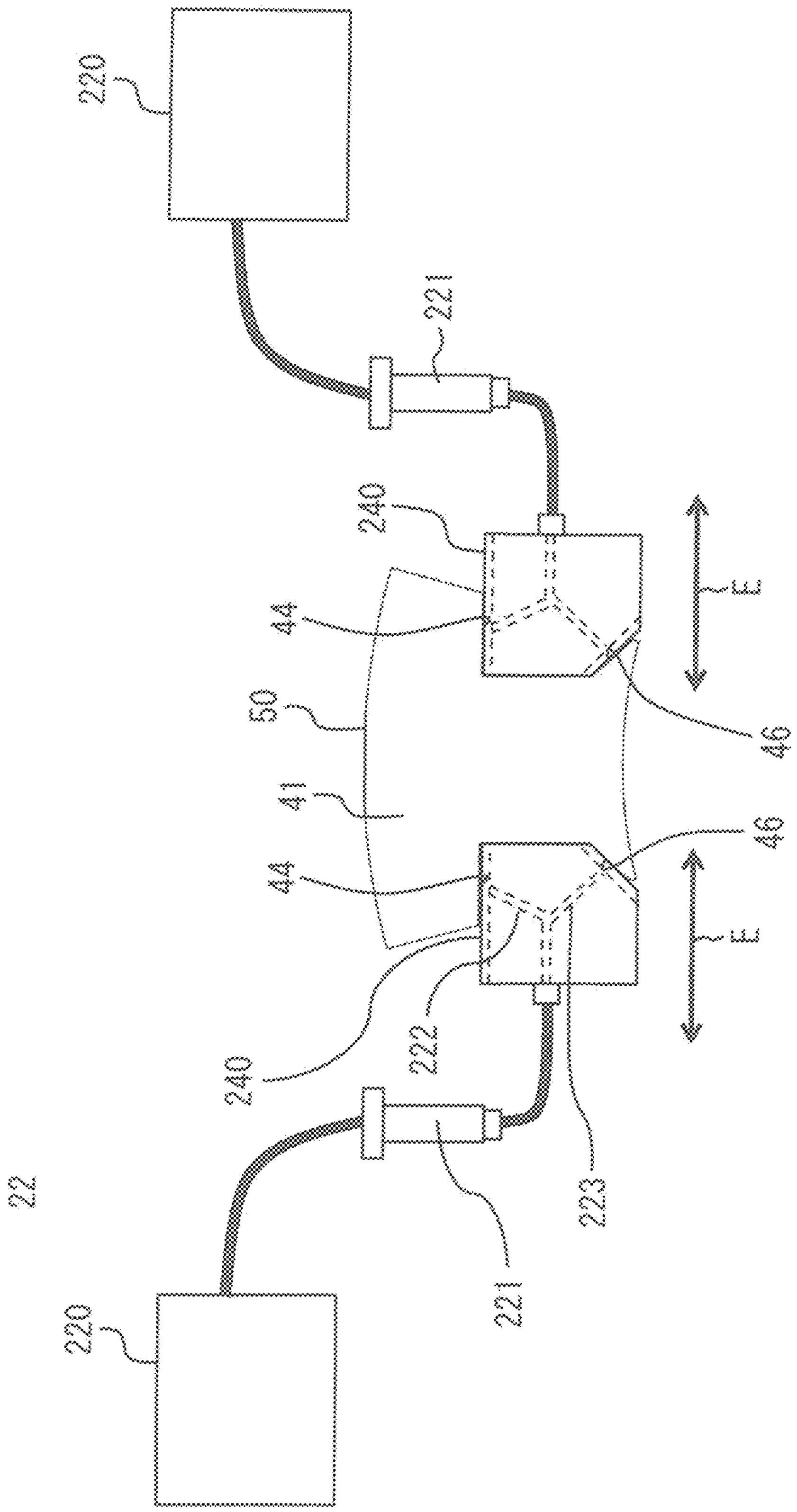
FIG. 15 shows a configuration of an application device for applying an adhesive in an application step of the method for manufacturing the stacked core shown in FIG. 13.
Figure 16:
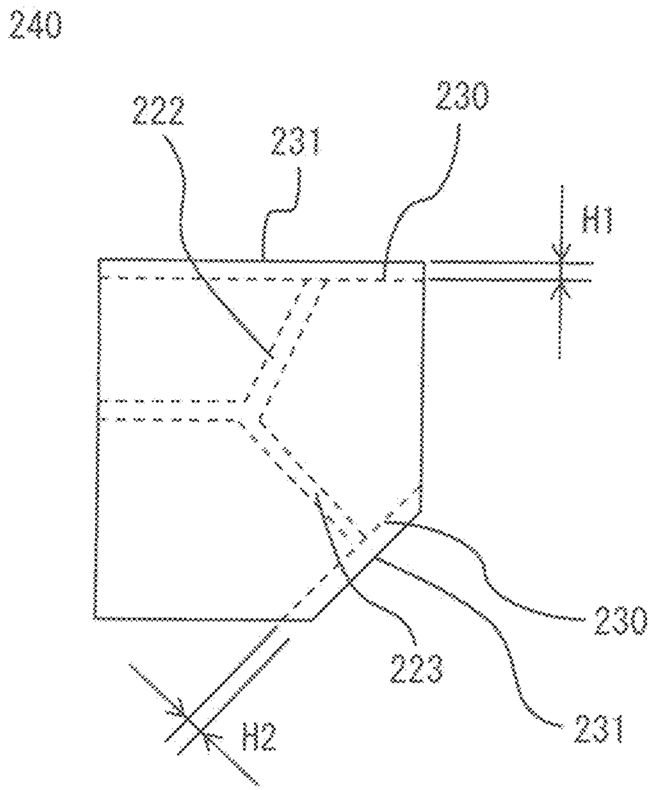
FIG. 16 is a plan view showing a configuration of a nozzle of the application device shown in FIG. 15.
Figure 17:
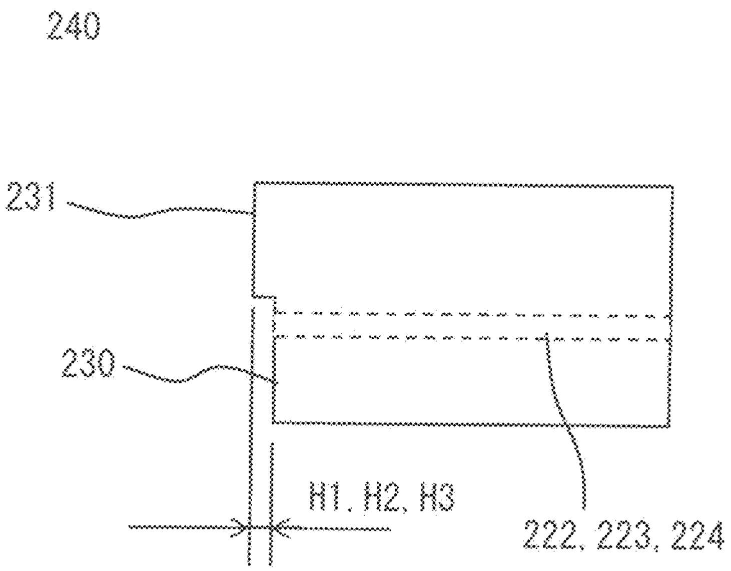
FIG. 17 is a side view showing the configuration of the nozzle of the application device shown in FIG. 15.
Figure 18:
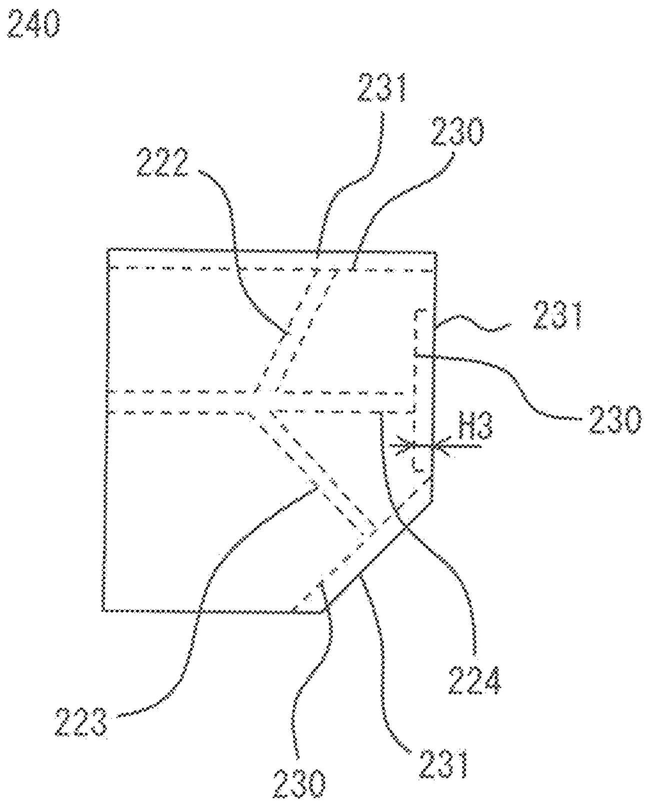
FIG. 18 is a plan view showing a configuration of another nozzle of the application device shown in FIG. 15.
Figure 19:
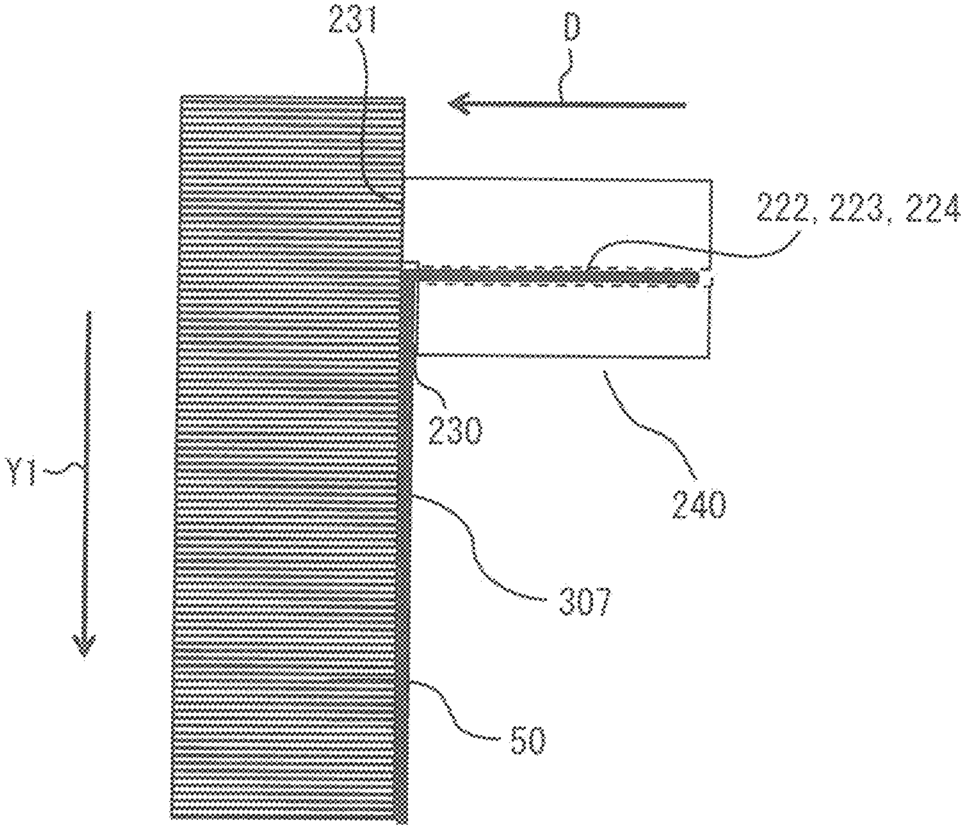
FIG. 19 is a side view showing a positional relationship between the stacked core and the nozzle shown in FIG. 15.

FIG. 15 shows a configuration of an application device for applying an adhesive in an application step of the method for manufacturing the stacked core shown in FIG. 13. FIG. 16 is a plan view showing a configuration of a nozzle of the application device shown in FIG. 15. FIG. 17 is a side view showing the configuration of the nozzle of the application device shown in FIG. 15. FIG. 18 is a plan view showing a configuration of another nozzle of the application device shown in FIG. 15. FIG. 19 is a side view showing a positional relationship between the stacked core and the nozzle shown in FIG. 15.

Figure 23:
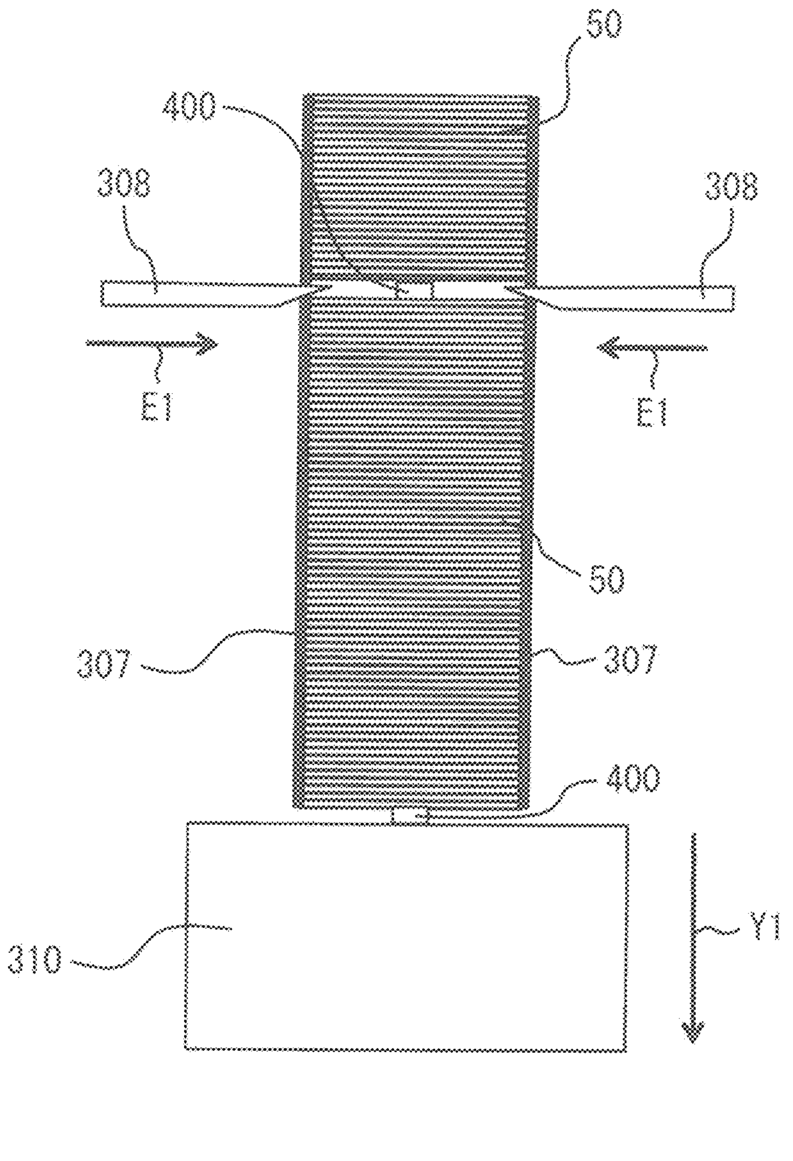
FIG. 23 shows the division step of the method for manufacturing the stacked core shown in FIG. 13.
Figure 24:
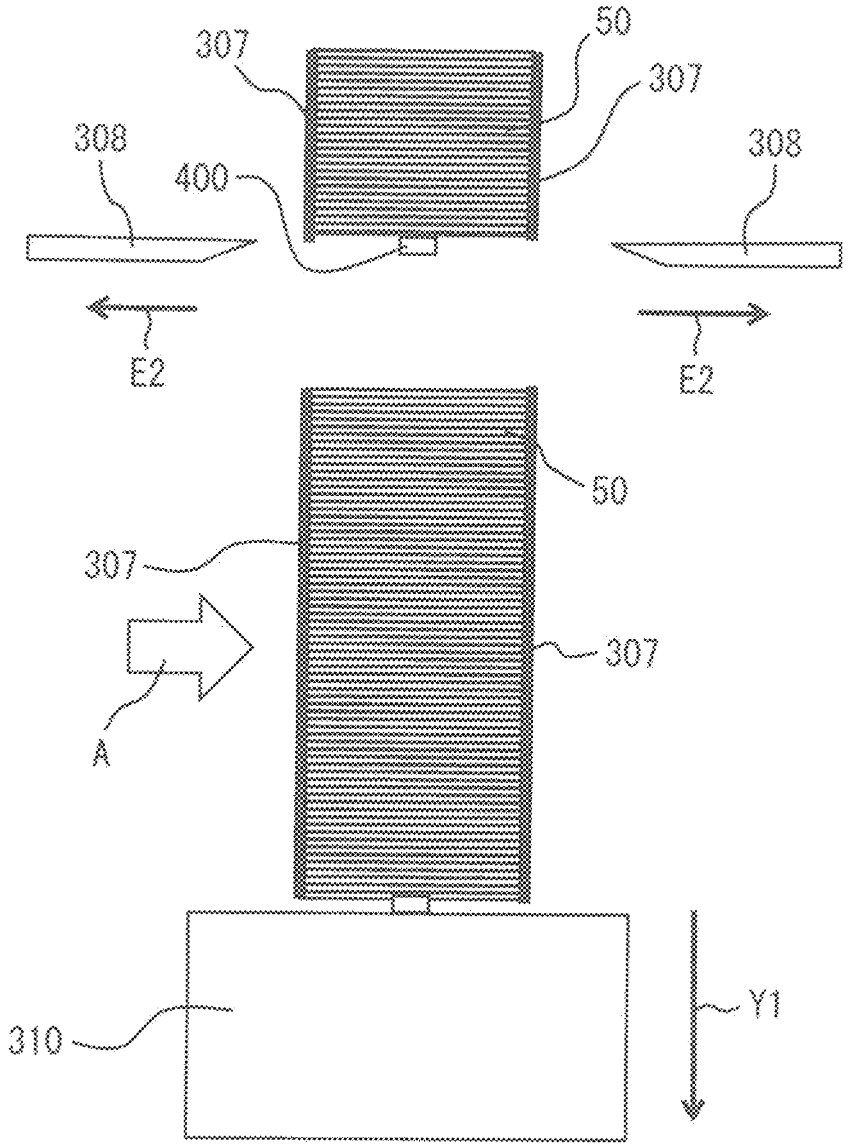
FIG. 24 shows the division step of the method for manufacturing the stacked core shown in FIG. 13.
Figure 25:
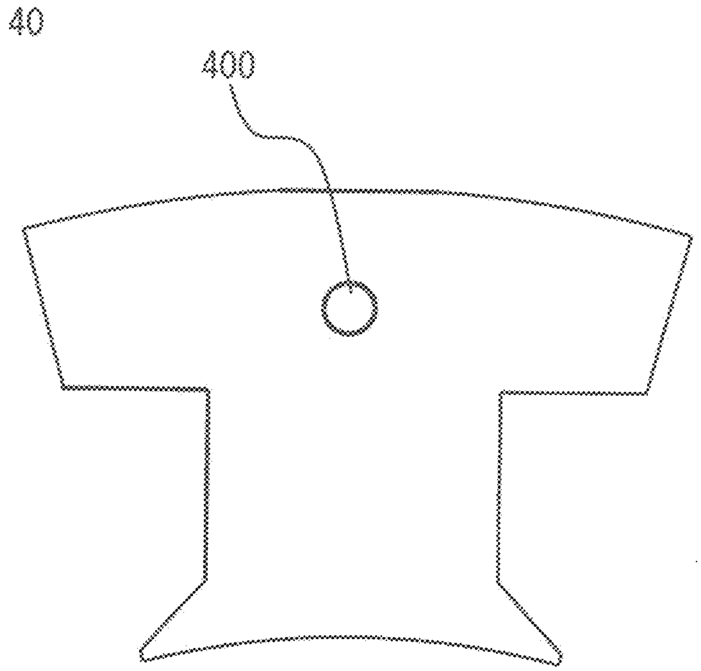
FIG. 25 is a plan view showing a configuration of a core piece formed at a division position between stacked cores in embodiment 1.
Figure 26:
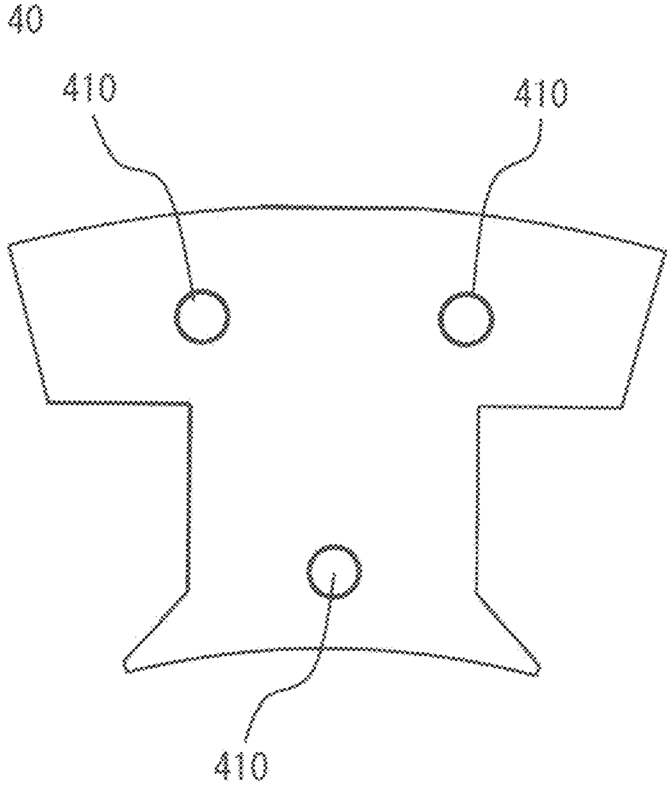
FIG. 26 is a plan view showing another configuration of a core piece formed at a division position between stacked cores in embodiment 1.
Figure 27:
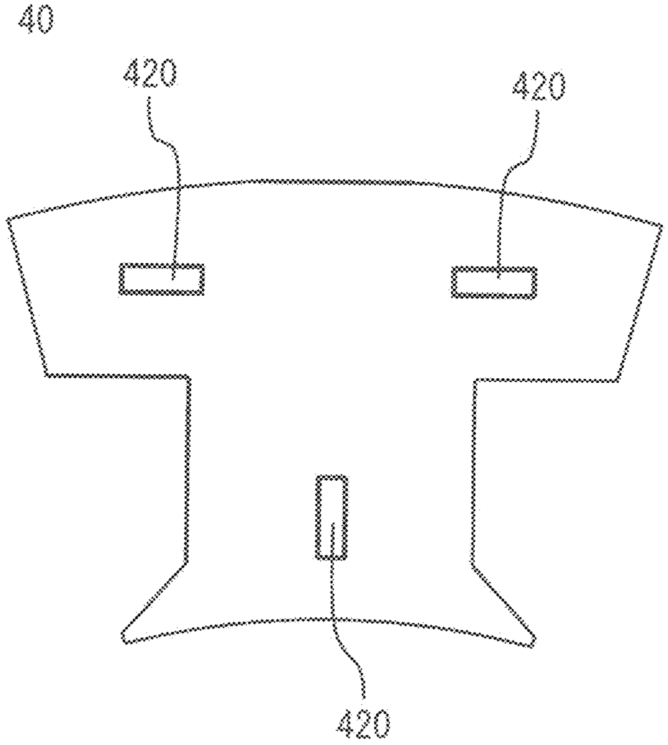
FIG. 27 is a plan view showing another configuration of a core piece formed at a division position between stacked cores in embodiment 1.

FIG. 20 to FIG. 24 show a division step of the method for manufacturing the stacked core shown in FIG. 13. FIG. 25 is a plan view showing a configuration of a core piece formed at a division position between stacked cores in embodiment 1. FIG. 26 is a plan view showing another configuration of a core piece formed at a division position between stacked cores in embodiment 1. FIG. 27 is a plan view showing another configuration of a core piece formed at a division position between stacked cores in embodiment 1.

In FIG. 1, the rotating electric machine 100 includes a cylindrical frame 1, an upper bracket 2 and a lower bracket 3 that close openings of the frame 1, the stator 10 as an armature stored in a cylindrical part of the frame 1, and a rotor 20 which is fixed to a rotary shaft 6 provided in the axial direction Y via bearings 4, 5 at axial-center positions of the upper bracket 2 and the lower bracket 3 of the frame 1 and supported rotatably, the rotor 20 being rotatably provided on the inner circumferential side on the inner side X2 in the radial direction X of the stator 10 and configured to generate a magnetic field.

The rotor 20 is a permanent magnet rotor including a rotor core 7 fixed to the rotary shaft 6 inserted at the axial-center position, and a plurality of permanent magnets 8 which are pasted on the outer circumferential surface side of the rotor core 7 so as to be arranged at a predetermined pitch in the circumferential direction 2, and form magnetic poles. The rotor 20 is not limited to a permanent magnet rotor, and may be a squirrel-cage rotor configured such that rotor conductors which are not insulated are stored in slots of a rotor core and are short-circuited on both sides by Short-circuit rings, or a winding rotor configured such that insulated conductor wires are mounted to slots of a rotor core.

In FIG. 2 and FIG. 3, the stator 10 is formed in an annular shape and fixed in the frame 1. The stator 10 includes a stacked core 50 as a stator core formed by stacking a predetermined number of core pieces 40 in the axial direction Y, a coil 33 formed from a magnet wire having an insulation coat on the surface of an element wire of copper, aluminum, or the like, and an insulator 34 serving to retain the coil 33 and make electric insulation between the Stacked core 50 and the coil 33. Examples of a resin material of the insulator 34 include nylon, polyphenylene sulfide (PPS), liquid crystal polymer (LCP), and polybutyleneterephtalate (PBT).

As shown in FIG. 4, the insulator 34 in embodiment 1 is formed by integral molding with the stacked core 50. The insulator 34 is formed such that all of surfaces forming slot areas 30 described later and both end surfaces in the axial direction Y of the stacked core 50 are covered with resin, and the strength and the rigidity of the stacked core 50 can be improved by the insulator 34.

The insulator 34 is not limited to this example. As another example, as shown in FIG. 5, insulators 381, 382 are mounted to both end surfaces in the axial direction Y of the stacked core 50, and insulators 391, 392 formed of insulation sheets are pasted on surfaces forming the slot areas 30, thus ensuring insulation between the coil 33 and the stacked core 50. The insulators 391, 392 formed of insulation sheets can be formed through press molding of an insulation sheet prepared by interposing a polyphenylene sulfide (PPS) film between aramid sheets or an insulation Sheet prepared by interposing polyethylene terephthalate (PET) between PPS and PPS, for example.

As compared to the case of the insulator 34 formed by integral molding in FIG. 4, using the insulators 391, 392 in FIG. 5 can reduce the thickness of parts covering the surfaces forming the slot areas 30, whereby the thermal resistance can be reduced and thus heat generated in the coil 33 can be more dissipated.

In FIG. 6 and FIG. 7, multiple core pieces 40 stamped in the same shape from a belt-shaped electromagnetic steel sheet are stacked in the axial direction Y and then integrated to form the stacked core 50. The core piece 40 includes a core-back portion 41, a tooth portion 42, and shoe portions 43. The core-back portion 41 is formed in an arc shape. The tooth portion 42 is formed to extend toward the inner side X2 in the radial direction X from a center part in the circumferential direction 2 of a core-inner-circumferential surface 44 on the inner side X2 in the radial direction X of the core-back portion 41. The shoe portions 43 are formed to extend toward both sides in the circumferential direction Z from the inner side X2 end in the radial direction X of the tooth portion 42.

Regarding the core piece 40 and the stacked core 50, a surface along the axial direction Y on the outer side X1 in the radial direction X of the core-back portion 41 is referred to as a core-outer-circumferential surface 47, and a surface along the axial direction Y on the inner side X2 in the radial direction X of the core-back portion 41 is referred to as the core-inner-circumferential surface 44. Surfaces along the axial direction Y at both ends in the circumferential direction 2 of the core-back portion 41 are referred as core side surfaces 401. Regarding the core piece 40 and the stacked core 50, surfaces along the axial direction Y at both ends in the circumferential direction Z of the tooth portion 42 are referred to as tooth side surfaces 45. A surface along the axial direction Y at a distal end on the inner side X2 in the radial direction K of the tooth portion 42 is referred to as a distal-end surface 48. Regarding the core piece 40 and the stacked core 50, surfaces along the axial direction Y on the outer side X1 in the radial direction X of the shoe portions 43 are referred to as shoe-outer-circumferential surfaces 46.

An area surrounded by the core-back portion 41, the tooth portion 42, and the shoe portion 43 of the core piece 40 is the slot area 30 where the coil 33 is arranged. Therefore, surfaces of the core piece 40 that form the slot area 30 are the core-inner-circumferential surface 44 of the core-back portion 41, the tooth side surface 45 of the tooth portion 42, and the shoe-outer-circumferential surface 46 of the shoe portion 43. In embodiment 1, a case where the core piece 40 and the stacked core 50 are divided for each tooth portion 42 in the circumferential direction Z, is shown.

The electromagnetic steel sheet forming the core piece 40 is formed with an insulation coat provided on the surface of a material having high permeability. Thus, even when the electromagnetic steel sheets are stacked in the axial direction Y, the core pieces 40 adjacent in the axial direction Y are insulated from each other and therefore do not allow electric conduction therebetween. In order to fix the core pieces 40 in this state, an adhesive is applied on any of the core-inner-circumferential surface 44, the tooth side surface 45, and the shoe-outer-circumferential surface 46 which are surfaces forming the slot area 30 of the stacked core 50, so as to form an adhesion portion 9 described later, whereby the core pieces 40 stacked in the axial direction Y are fixed with each other.

In a fixation method using swaging or welding, which is a conventional method for fixation in the axial direction Y, parts stacked in the axial direction Y allow electric conduction therebetween, so that eddy current is generated at the parts and iron loss increases. However, in embodiment 1, the state in which the core pieces 40 stacked in the axial direction Y are insulated from each other is kept when they are fixed by the adhesion portion 9. Therefore, eddy current is suppressed and rotating electric machine efficiency can be improved.

On at least one of the core-inner-circumferential surface 44, the tooth side surface 45, and the shoe-outer-circumferential surface 46 of every core piece 40 stacked in the axial direction Y, the adhesion portion 9 is applied and formed across the core pieces 40 continuously or intermittently in the axial direction Y. The above-described insulator 34, 391, 392 formed of an insulation material is provided at the core-inner-circumferential surface 44, the tooth side surface 45, and the shoe-outer-circumferential surface 46 of the core piece 40. The adhesion portion 9 is not adhered to the insulator 34, 391, 392 and is formed between the insulator 34, 391, 392 and the stacked core 50.

Figure 10:
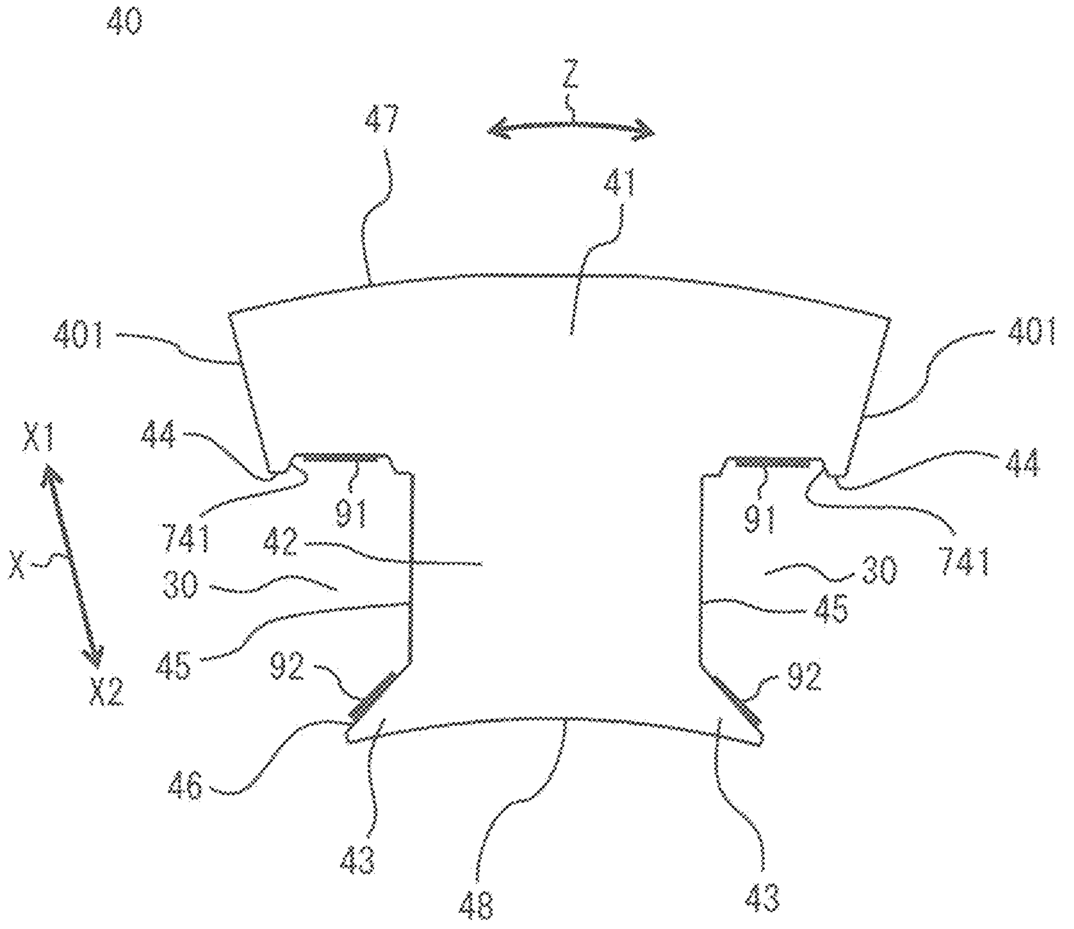
FIG. 10 is a plan view showing a state in which adhesion portions are formed in a modification of the core piece shown in FIG. 6.

In FIG. 8 to FIG. 10, specific examples of locations where the adhesion portions 9 are formed will be described. As shown in FIG. 8, adhesives are applied on the tooth side surfaces 45 of the tooth portion 42, whereby the adhesion portions 9 are formed. Since the adhesives are applied on the tooth side surfaces 45 of the tooth portion 42, a large application area can be ensured and the strength against separation between stacked parts can be increased.

In another example, as shown in FIG. 9, adhesives are applied on the core-inner-circumferential surfaces 44 of the core-back portion 41 and the shoe-outer-circumferential surfaces 46 of the shoe portion 43, whereby adhesion portions 91, 92 are formed. In a case where the adhesion strength has a margin as compared to a required strength, adhesives may be applied at the above positions to form the adhesion portions 91, 92, whereby, as compared to the case shown in FIG. 8, the space of the slot area 30 where the coil 33 is wound can be enlarged, so that the space factor of the coil 33 can be increased and efficiency of the rotating electric machine 100 can be improved.

In a case of desiring to further increase the space factor of the coil 33, as shown in FIG. 10, a recess 741 recessed toward the outer side X1 in the radial direction X and extending in the axial direction Y is formed on the core-inner-circumferential surface 44 of the core-back portion 41, and the adhesion portion 91 is formed to be accommodated in the recess 741. Thus, the recess 741 is formed at an end surface of an outer periphery of the core-back portion 41 of the stacked core 50 (the "end surface of the outer periphery of the core-back portion 41" refers to a surface formed along the axial direction Y at the outer periphery of the core-back portion 41 except for both ends in the axial direction Y of the core-back portion 41). For example, in a case where a magnetic path on the core-back portion 41 side has a margin in a magnetic sense as compared to the amount of a magnetic flux passing through the stacked core 50, the recess 741 may be provided at the margin part, whereby it is possible to ensure an application space for the adhesion portion 91 without narrowing the space of the slot area 30 and thus the space factor of the coil 33 can be increased.

Figure 28:
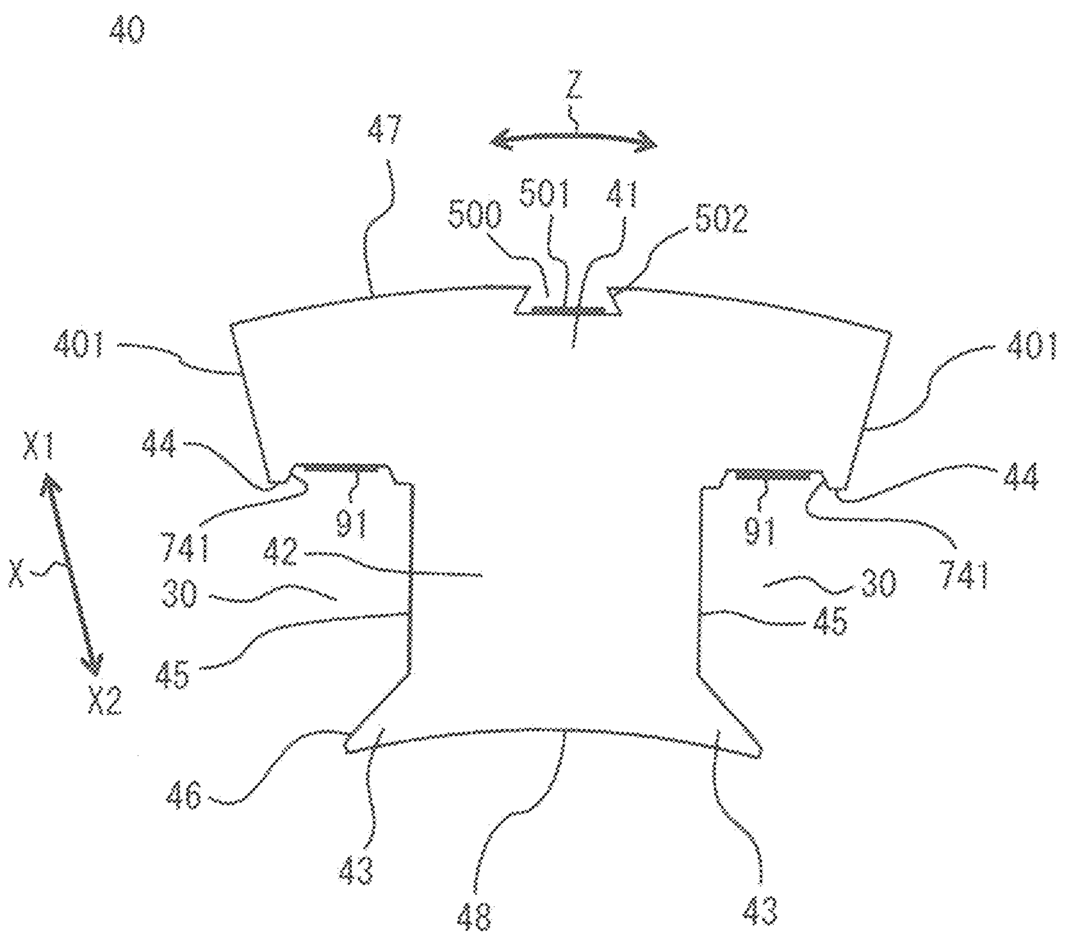
FIG. 28 is a plan view showing a state in which adhesion portions are formed in a modification of the core piece shown in FIG. 6.

In a case of desiring to increase the adhesion strength of the stacked core 50, as shown in FIG. 28, in addition to the above-described recess 741 (corresponding to a second recess), a recess 500 (corresponding to a first recess) recessed toward the inner side X2 in the radial direction X and extending in the axial direction Y is further formed on the core-outer-circumferential surface 47. Thus, the recess 500 is formed at an end surface of an outer periphery of the core-back portion 41 of the stacked core 50. Then, the adhesion portion 91 and an adhesion portion 501 are formed to be accommodated in the recess 500 and the recess 741, respectively. Further, as a limitation, the adhesion portion 91 and the adhesion portion 501 are formed only on the bottom side opposite to an opening 502 side on the outer periphery side in the recess 741 and the recess 500. The adhesion portion 91 and the adhesion portion 501 are not formed on side surfaces of the recess 500 and the recess 741.

Regarding the adhesion portion 501 in the recess 500 of the core-outer-circumferential surface 47, the adhesion portion 501 does not protrude beyond the core-outer-circumferential surface 47 toward the outer side X1 in the radial direction X, and therefore does not interfere with the frame 1 for fixing the stacked core 50 as shown in FIG. 1, so that an assembly process such as press-fitting or shrink-fitting can be easily performed. In addition, since the adhesion portion 501 and the adhesion portion 91 are provided at both of the recess 500 of the core-outer-circumferential surface 47 and the recess 741 of the core-inner-circumferential surface 44 of the core-back portion 41, the total adhesion area can be increased, whereby the adhesion strength of the stacked core 50 can be increased and the quality can be improved.

Figure 29:
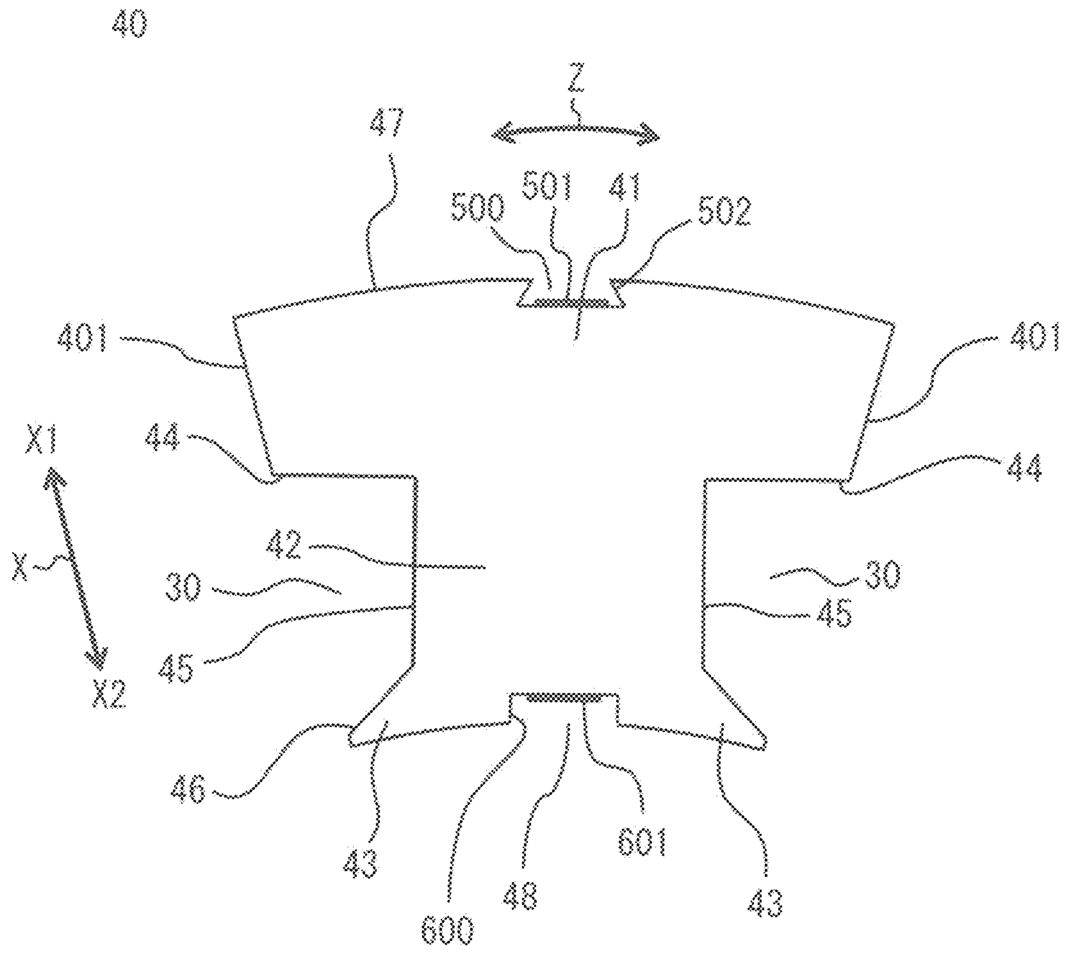
FIG. 29 is a plan view showing a state in which adhesion portions are formed in a modification of the core piece shown in FIG. 6.

FIG. 29 shows still another example. In addition to the above-described recess 500, a recess 600 recessed toward the outer side X1 in the radial direction X and extending in the axial direction Y is formed on the distal-end surface 48 of the tooth portion 42. Therefore, the recess 600 is formed at an end surface of an outer periphery of the tooth portion 42 of the stacked core 50 (the "end surface of the outer periphery of the tooth portion 42" refers to a surface formed along the axial direction Y at the outer periphery of the tooth portion 42 except for both ends in the axial direction Y of the tooth portion 42). Then, the adhesion portion 501 and an adhesion portion 601 are formed to be accommodated in the recess 500 and the recess 600, respectively. The adhesion portions 501, 601 are formed to be accommodated in the respective grooves.

As shown in FIG. 29, since the adhesion portion 601 does not protrude beyond the recess 600 of the distal-end surface 48 of the tooth portion 42 toward the inner side X2 in the radial direction X, the adhesion portion 601 can be prevented from interfering with the rotor 20 of the rotating electric machine 100 as shown in FIG. 1, so that motor performance can be stabilized. In addition, since the adhesion portion 501 and the adhesion portion 601 are provided at both of the recess 500 of the core-outer-circumferential surface 47 and the recess 600 of the distal-end surface 48, the total adhesion area can be increased, whereby the adhesion strength of the stacked core 50 can be increased and the quality can be improved.

Figure 30:
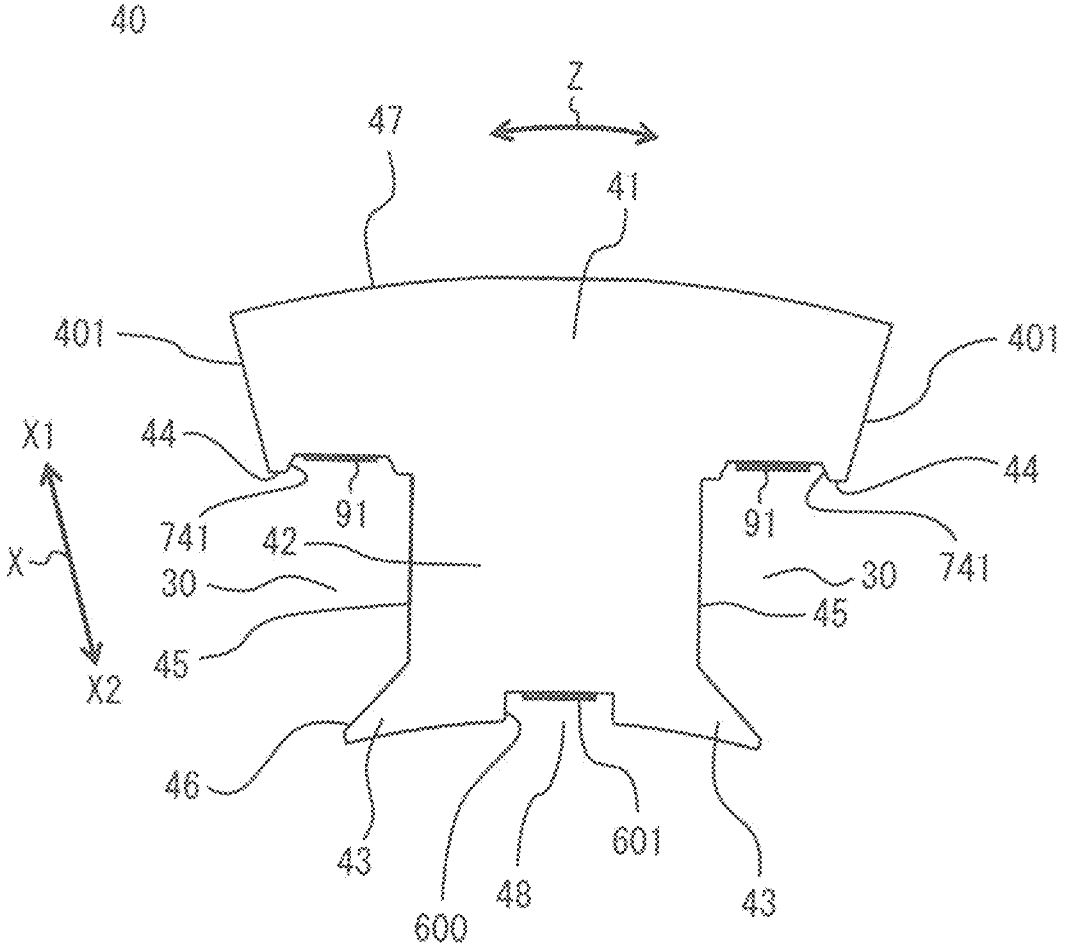
FIG. 30 is a plan view showing a state in which adhesion portions are formed in a modification of the core piece shown in FIG. 6.

FIG. 30 shows still another example. The above-described recess 741 of the core-inner-circumferential surface 44 of the core-back portion 41 and the above-described recess 600 of the distal-end surface 48 of the tooth portion 42 are provided. Then, the adhesion portion 91 and the adhesion portion 601 are formed to be accommodated in the recess 741 and the recess 600, respectively. Thus, the total adhesion area can be increased, whereby the adhesion strength of the stacked core 50 can be increased and the quality can be improved.

Regarding the recess 500 of the core-outer-circumferential surface 47, adhesion portions are not formed on side surfaces of the recess 500 and the recess 741. Therefore, a jig for fixing the stacked core 50 at the time of winding a coil can be fixed in contact with side surfaces of the recess 500 and the recess 741, whereby stable winding can be performed, In still another example, a recess may be formed on the core side surface 401 of the core-back portion 41. In this case, it is desirable that the recess is provided in such a range that does not cause an influence on a magnetic flux flowing through the adjacent stacked core 50.

Each recess may be formed partially in the axial direction Y on the stacked core 50. In this case, fastening in the axial direction Y between the core pieces having no recesses is performed by means other than adhesion, e.g., swaging, whereby the stacked core pieces are fastened in the axial direction Y.

Each recess may be formed to extend in the axial direction Y on all the core pieces 40. Each adhesion portion may be formed at the recess on the core pieces 40 overall continuously or intermittently in the axial direction Y. In this case, it is possible to fasten the core pieces 40 in the axial direction Y by only the adhesion portions, so that deformation of the core pieces 40 due to fastening by swaging or the like can be prevented and thus magnetic deterioration of the core piece 40 can be prevented. Hereinafter, when the adhesion portion 9 is mentioned, this refers to a collective term of the adhesion portions 9, 91, 92, 501, 601.

In the above examples, the adhesion portion in each recess is formed only at the bottom of the recess. However, without limitation thereto, the adhesion portion may be formed to be accommodated in the recess. That is, the adhesion portion may extend from the bottom to a side wall of the recess. In this case, adhesion by the adhesion portion is more reliable.

The adhesive forming the adhesion portion 9 may be a two-part curing adhesive, for example. The two-part curing adhesive includes a main agent and a curing agent, and the main agent may be an epoxy-based adhesive, an acrylic adhesive, or the like. In this case, a heating process is not performed and therefore the configuration of manufacturing equipment can be made compact, and also, thermal energy is reduced and therefore an energy saving effect is obtained.

The adhesive forming the adhesion portion 9 may be an adhesive of a thermosetting type represented by an epoxy-based adhesive, for example. In this case, even when the adhesive is adhered to manufacturing equipment, the adhesive is not cured until heat is applied. Therefore, before thermal curing, the adhesive adhered to the manufacturing equipment can be removed by only wiping, and thus ease of maintenance is improved. In addition, the adhesive of a thermosetting type has a higher withstand temperature as compared to an adhesive curable under the normal temperature, so that the heat resistance of the stacked core 50 is improved.

The adhesive forming the adhesion portion 9 may be an adhesive of an ultraviolet-curing type, for example. In this case, even when the adhesive is adhered to manufacturing equipment, the adhesive is not cured until the adhesive is irradiated with an ultraviolet ray. Therefore, before thermal curing, the adhesive adhered to the manufacturing equipment can be removed by only wiping, and thus ease of maintenance is improved.

Since the adhesive is applied on at least one of the core-inner-circumferential surface 44 of the core-back portion 41, the tooth side surface 45 of the tooth portion 42, and the shoe-outer-circumferential surface 46 of the shoe portion 43 which form the slot area 30 as described above, the adhesive is not applied on the core-outer-circumferential surface 47. Therefore, after a plurality of stacked cores 50 provided with the insulators 34 and the coils 33 are arranged in an annular shape, when the inner circumferential surface of the attachment frame 1 is shrink-fitted or press-fitted to the core-outer-circumferential surfaces 47 on the outer side X1 in the radial direction X of the stacked cores 50, there is no adhesive on the core-outer-circumferential surfaces 47, and thus shape accuracy of the stator 10 after assembly can be improved.

When the core side surfaces 401 of the stacked cores 50 adjacent in the circumferential direction 2 are brought into contact with each other and the plurality of stacked cores 50 provided with the insulators 34 and the coils 33 are arranged in an annular shape to assemble the stator 10, adhesives are not applied on the core side surfaces 401 of the stacked cores 50, and therefore assembly accuracy of the stator 10 is stabilized and shape accuracy of the stator 10 is improved. Thus, for example, torque ripple can be reduced, so that rotating electric machine performance is improved.

Next, the method for manufacturing the rotating electric machine configured as described in the above embodiment 1 will be described with reference to a flowchart in FIG. 12. First, in a stacked core formation step of step ST6 in FIG. 12, the core pieces 40 shown in FIG. 6 are stacked in the axial direction Y, to form the stacked core 50 as shown in FIG. 7. At this time, an adhesive is applied on at least one of the core-inner-circumferential surface 44 of the core-back portion 41, the tooth side surface 45 of the tooth portion 42, and the shoe-outer-circumferential surface 46 of the shoe portion 43 which form each slot area 30, so that the adhesion portions 9 are formed on all the core pieces 40 continuously or intermittently in the axial direction Y of the stacked core 50.

Next, in an insulator formation step of step ST7 in FIG. 12, the insulator 34 is formed at the stacked core 50, as shown in FIG. 4. Before the insulator formation step, the adhesion portions 9 are already cured. Therefore, the adhesion portions 9 are not adhered to the insulator 34 and are formed between the insulator 34 and the stacked core 50.

Next, in a coil formation step of step ST8 in FIG. 12, a magnet wire is wound around the tooth portion 42 of the divided stacked core 50, to form the coil 33.

Next, in a stator formation step of step ST9 in FIG. 12, a plurality of stacked cores 50 provided with the insulators 34 and the coils 33 are arranged in an annular shape, and the core-outer-circumferential surfaces 47 of the core-back portions 41 are fixed to the inner circumferential surface of the frame 1. Next, in a rotating electric machine formation step of step ST10 in FIG. 12, the rotary shaft 6 of the rotor 20 is rotatably supported at the upper bracket 2 and the lower bracket 3 by bearings, i.e., the bearings 4, 5, and the rotor 20 is provided so as to be opposed to the stator 10 with a gap therebetween, to form the rotating electric machine 100.

The stacked core formation step in the method for manufacturing the rotating electric machine 100 shown above will be described in detail with reference to a flowchart in FIG. 11, and FIG. 13. First, in a stamping step of step ST1 in FIG. 11 and FIG. 13, an electromagnetic steel sheet 301 which is a belt-shaped plate material rolled in a reel shape is led by an uncoiler and then is fed into a hydraulic or electric press machine by a feeding device. In the press machine, the electromagnetic steel sheet 301 is stamped into a predetermined shape of the core piece 40 by a die 302 and a first punch 303. Before the stamping, a projection 400 (see FIG. 25) projecting in the axial direction Y is formed on the electromagnetic steel sheet 301 for every specified number of sheets, by a second punch 304.

Each punch 303, 304 can be moved out from and retracted into a die by a cam mechanism and an air cylinder or a servomotor provided in the die, and is moved out or retracted by the cylinder or the servomotor being controlled in accordance with a command from a controller of the press machine.

Next, in an alignment step of step ST2 in FIG. 11 and FIG. 13, the stamped core pieces 40 are aligned by an alignment guide 305 and stacked in the stacking direction Y, to form the stacked core 50. The stacking direction Y is the same direction as the above-described axial direction Y. Next, in an application step of step ST3 in FIG. 11 and FIG. 13, an adhesive 307 is applied continuously in the axial direction Y on at least one of the core-inner-circumferential surface 44, the tooth side surface 45, and the shoe-outer-circumferential surface 46 of the core piece 40 of the stacked core 50.

Next, in a curing step of step ST4 in FIG. 11 and FIG. 13, the adhesives 307 are cured by being heated by a heater 306, to form the adhesion portions 9. During a period from the alignment step to the curing step, constraint of the stacked core 50 by the alignment guide 305 is kept. Next, in a division step of step ST5 in FIG. 11 and FIG. 13, at a position in the axial direction Y where the projection 400 is formed in the stacked core 50 continuous in the axial direction Y, the adhesion portions 9 are cut by cutting devices 308, to divide each stacked core 50. In the following description, the adhesion portion 9 formed by the adhesive 307 being cured and the adhesive 307 that has not been cured are both referred to as the adhesive 307.

Hereinafter, each step will be described in more detail. First, the alignment step will be described. The alignment guide 305 used in the alignment step includes, specifically, a first restriction portion 31 for pressing the core-outer-circumferential surface 47 of the core-back portion 41 of the core piece 40, a second restriction portion 32 for pressing the distal-end surface 48 of the tooth portion 42 of the core piece 40, and third restriction portions 333 for pressing the tooth side surfaces 45 of the tooth portion 42, as shown in FIG. 14. Then, the position of each core piece 40 is restricted by the alignment guide 305, whereby the plurality of core pieces 40 are aligned in the stacking direction Y.

In FIG. 14, the first restriction portion 31, the second restriction portion 32, and the third restriction portions 333 are separated from each other, but they may be integrated with each other as long as their functions can be exerted. It is not necessary to provide all the restriction portions 31, 32, 333, and it suffices that the core pieces 40 can be aligned in the stacking direction Y. For example, only the first restriction portion 31 and the second restriction portion 32 may be provided without providing the third restriction portions 333. In this case, there are no third restriction portions 333 at positions of the slot areas 30, and therefore it is possible to easily shift to the subsequent step, i.e., the application step for the adhesive 307.

Next, an adhesion step will be described. For example, as shown in FIG. 15, the application device 22 for the adhesive 307 includes nozzles 240 each having path portions 222, 223 connected to a syringe 221 containing the adhesive 307 via a dispenser control device 220 for feeding the adhesive 307. As shown in FIG. 15 and FIG. 16, for example, in a case of applying the adhesive 307 on the core-inner-circumferential surface 44 of the core-back portion 41 and the shoe-outer-circumferential surface 46 of the shoe portion 43, each nozzle 240 has two paths branched therein, and the adhesive 307 fed from the dispenser control device 220 flows into the nozzle 240 and then is branched into the two paths, so that the adhesives 307 are applied on the core-inner-circumferential surface 44 of the core-back portion 41 and the shoe-outer-circumferential surface 46 of the shoe portion 43 via the path portions 222, 223 at the same time.

As shown in FIG. 17 and FIG. 19, the nozzle 240 has a positioning portion 231, and the positioning portion 231 is brought into contact with an application surface of the 25 stacked core 50. Here, as described above, the application surface is at least one of the core-inner-circumferential surface 44 of the core-back portion 41, the tooth side surface 45 of the tooth portion 42, and the shoe-outer-circumferential surface 46 of the shoe portion 43 which form the slot area 30, and the description thereof is omitted.

The adhesive 307 is ejected in an introduction direction D from the nozzle 240. The nozzle 240 has a leveling surface 230 for the adhesive 307, at a position away from the application surface of the stacked core 50 by a certain distance H1, H2, H3 (the distance H3 will be described later), whereby the adhesive 307 is leveled. Since the leveling surface 230 is formed at a position away from the application surface of the core piece 40 by the predetermined distance H1, H2, H3, the thickness of the leveled adhesive 307 is uniformed to be a thickness corresponding to the distance H1, H2, H3 between the leveling surface 230 and the application surface of the core piece 40.

As the application surfaces for the adhesive 307, the core-inner-circumferential surface 44 of the core-back portion 41 and the shoe-outer-circumferential surface 46 of the shoe portion 43 have been shown as an example. However, without limitation thereto, the adhesive 307 may be applied on also the tooth side surface 45 of the tooth portion 42, in addition to the core-inner-circumferential surface 44 of the core-back portion 41 and the shoe-outer-circumferential surface 46 of the shoe portion 43. In this case, as shown in FIG. 18, the nozzle 240 has three branched path portions 222, 223, 224, whereby the adhesive 307 can be applied in the same manner, and the positioning portion 231 and the leveling surface 230 are arranged with the predetermined distance H3 provided in the same manner, whereby the thickness of the adhesive 307 can be uniformed in the same manner. In a case where the thicknesses of the adhesives 307 are different among the application surfaces for the adhesives 307, the distances H1, H2, H3 from the positioning portions 231 to the leveling surfaces 230 of the nozzle 240 may be set individually, whereby the predetermined distances can be changed.

The nozzle 240 is supported by a guide mechanism (not shown) so as to be movable in the stacking direction Y and a perpendicular direction E shown in FIG. 15, and the position of the nozzle 240 can be changed as appropriate by an actuator such as a cylinder or a servomotor. Thus, it is possible to keep the thickness of the adhesive 307 constant for each die, irrespective of dimension variation among the core pieces 40 due to difference in dies. The nozzles 240 may be provided independently of each other. Thus, it is possible to change the distance H1, H2, H3 from the core piece 40 to the leveling surface 230 for each application part, and adjustment can be performed individually in accordance with dimension variation at each part in a case of stamping the core pieces 40 using a plurality of kinds of dies, whereby the thicknesses of the adhesives 307 can be stabilized and adhesion strength variation can be reduced.

Next, the curing step will be described. In a case where the used adhesive is a thermosetting type as described above, the heater 306 for heating is provided to heat the adhesive, thus curing the adhesive. A heat insulation mechanism is provided between the heater 306 and the alignment guide 305 of the core piece 40, whereby heat of the heater 306 is prevented from transferring to the alignment guide 305. Thus, dimension change due to thermal expansion of the alignment guide 305 can be suppressed and deterioration in alignment accuracy of the core pieces 40 can be prevented.

As another example, in a case of using an adhesive of an ultraviolet-curing type, an ultraviolet irradiation device is provided instead of the heater 306, and the adhesive is irradiated with an ultraviolet ray, so as to be cured. In the case of using the adhesive of an ultraviolet-curing type, heat is not applied unlike the case of the thermosetting type, and therefore, a heat insulation mechanism as described above need not be provided, so that manufacturing equipment can be simplified and downsized.

As another example, in a case of using a two-part-mixed adhesive curable under the normal temperature or an anaerobic adhesive, the adhesive can be cured while the stacked core 50 is retained by the alignment guide 305, and therefore it is not necessary to separately provide manufacturing equipment for curing.

Although the curing step has been shown, the adhesives need not be completely cured in the above manufacturing equipment. Thus, in the curing step, it suffices that fixation is made to such an extent that stacked parts in the axial direction Y of the stator 10 will not be split or separated during conveyance after the stator 10 is taken out from the manufacturing equipment. In a subsequent step (not shown), for a thermosetting type, a heating step may be added so as to completely cure the adhesive, or for an ultraviolet-curing type, the adhesive may be further irradiated with an ultraviolet ray, so as to be completely cured. In either case, the adhesive contracts until being completely cured, so that stacking accuracy is changed. Therefore, it is desirable to guide the stacked core 50 by a jig or the like during curing.

Figure 20:
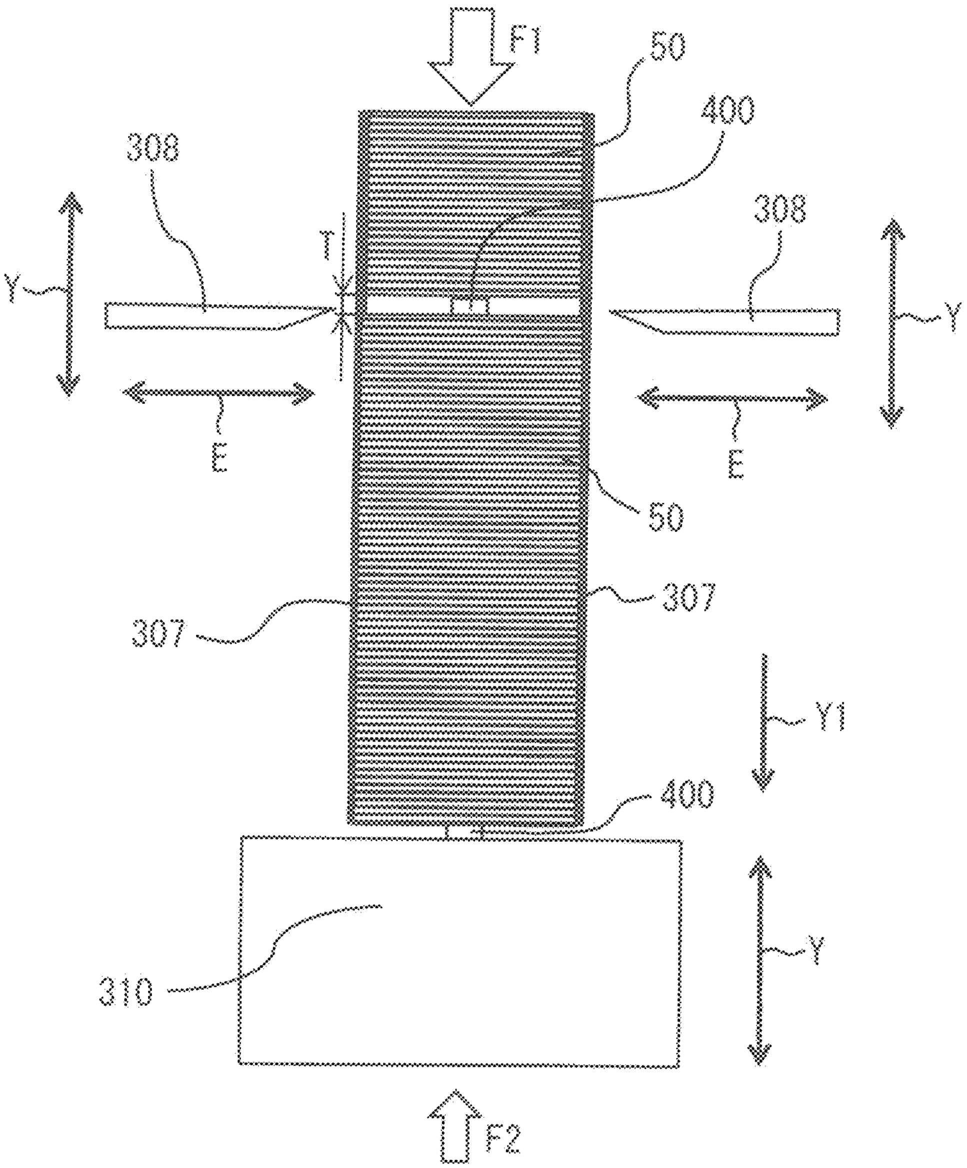
FIG. 20 shows a division step of the method for manufacturing the stacked core shown in FIG. 13.
Figure 21:
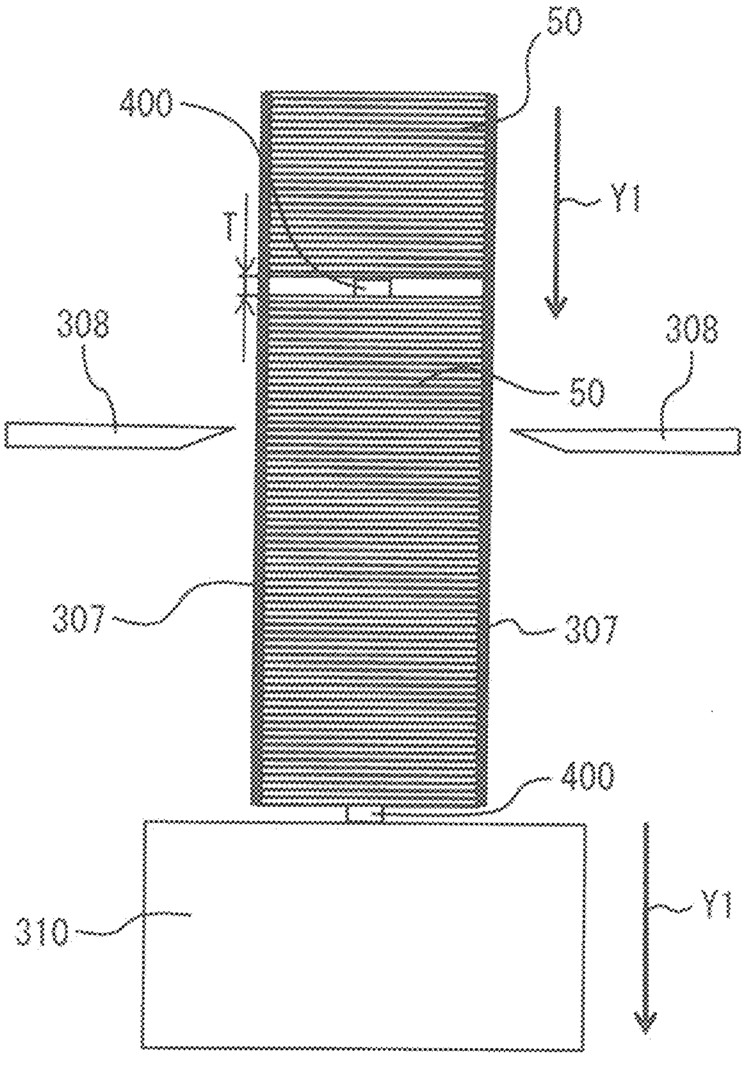
FIG. 21 shows the division step of the method for manufacturing the stacked core shown in FIG. 13.
Figure 22:
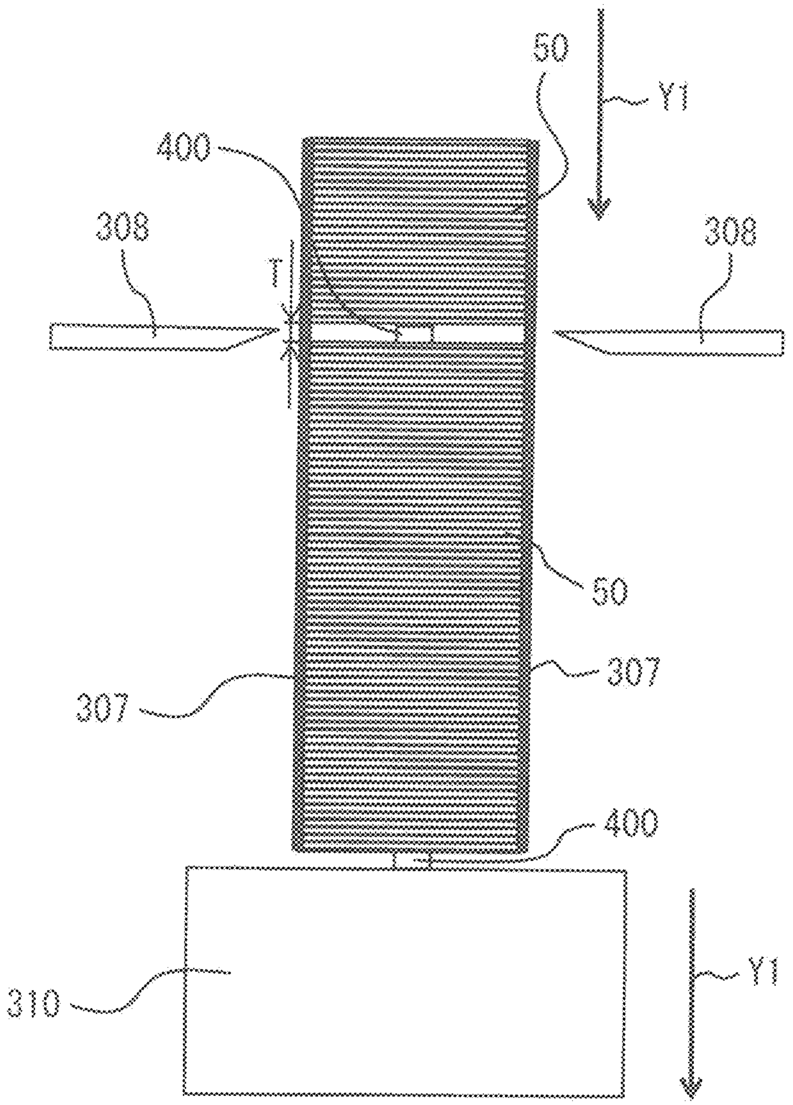
FIG. 22 shows the division step of the method for manufacturing the stacked core shown in FIG. 13.

Next, the division step will be described together with the stamping step, with reference to FIG. 20 to FIG. 24. As shown in FIG. 20, a support portion 310 for supporting the stacked core 50 from below is provided on the ejection side of the stacked core 50. The support portion 310 has a mechanism that can apply a load F2 to the lowermost part of the stacked core 50 upward so that a gap is not formed between stacked parts of the stacked core 50 formed by stacking the core pieces 40 in the axial direction Y, until reaching the division step. For example, as an actuator for the support portion 310, an air cylinder or a hydraulic cylinder is used and drives the support portion 310 upward/downward in the stacking direction Y.

The cutting devices 308 can move in the stacking direction Y and the perpendicular direction E shown in FIG. 20, relative to the stacked core 50. As compared to the load F2 of the support portion 310, a press load F1 when the core piece 40 is stamped by the press machine is set so as to satisfy F1>F2. When the core piece 40 is stamped by being pressed with the press load F1 and thus is pushed down in an advancement direction Y1, the load F2 on the support portion 310 side gives way to the press load F1, resulting in a state of being pushed toward the advancement direction Y1 side. The press load F1 and the load F2 serve to hold the stacked core 50 between both sides in the axial direction Y.

As described above in the stamping step, the core piece 40 stamped in the predetermined shape of the core piece 40 is stacked in the stacking direction Y. At a stage before the core piece 40 is stamped, the projection 400 is formed. Thus, the core piece 40 having the projection 400 and the core piece 40 not having the projection 400 are sequentially stamped and stacked. Here, the core piece 40 having the projection 400 is formed for once every predetermined number of core pieces 40 of the stacked core 50.

A gap T corresponding to the height of the projection 400 is formed between the core piece 40 having the projection 400 and the core piece 40 stamped one piece before (advancement direction Y1 side). Meanwhile, the adhesives 307 are applied continuously in the stacking direction Y, and the continuous stacked cores 50 divided by the gap T formed by the projection 400 are connected via the adhesives 307 continuous in the axial direction Y (FIG. 21), Thereafter, the stacked cores 50 that have undergone the curing step and are no longer constrained by the alignment guide 305, are ejected from the alignment guide 305, in a state of being supported by the above-described support portion 310 (FIG, 22).

Next, the cutting devices 308 for cutting the adhesives 307 are moved in an inward direction E1 of the stacked core 50 from both sides into the gap T formed between the stacked cores 50 by the projection 400, to cut the adhesives 307 connecting the stacked cores 50 (FIG. 23). Next, after the adhesives 307 are cut, the cutting devices 308 are moved in an outward direction E2 of the stacked core 50. Then, the support portion 310 is lowered in the advancement direction Y1 so that the stacked cores 50 are separated from each other. Then, the stacked core 50 is pushed out from the support portion 310 by a cylinder or the like or is grasped and taken out by a robot, for example, whereby the stacked core 50 is ejected in an ejection direction A (FIG. 24).

Also during cutting of the adhesives 307, the stamping step for the core pieces 40 continues, and thus the adhesives 307 at the cutting parts is moving in the advancement direction Y1 of the stacking direction Y. Therefore, the cutting devices 308 are provided on a driving device that can move upward/downward in the stacking direction Y so as to follow the above movement in the advancement direction Y1, and are controlled so that the cutting devices 308 can move in synchronization with movement of the core pieces 40.

Alternatively, a configuration in which the cutting devices 308 are provided on the support portion 310 described above, may be adopted. In addition, the up-down position in the stacking direction Y may be controlled by a servomotor or the like so that the positions of the cutting devices 308 can be corrected. Thus, even if there are stacking variations in the stacked cores 50 due to plate thickness variations so that the positions of the cutting devices 308 vary, it is possible to perform stable cutting by correcting the positions of the cutting devices 308.

The projection 400 formed on the core piece 40 is not limited to the above one. For example, as shown in FIG. 26, three projections 410 having round shapes and projecting in the axial direction Y may be formed on the core piece 40. Thus, a plurality of projections 410 may be provided. When a plurality of, e.g., three, projections 410 are provided as described above, forces to the core piece 40 on the advancement direction Y1 side stamped in the previous step are equalized, whereby the core piece 40 on the advancement direction Y1 side can be stably pushed. In another example, as shown in FIG. 27, three projections 420 having quadrangular shapes and protruding in the axial direction Y may be formed on the core piece 40.

In embodiment 1, the case where the core piece 40 has the shoe portions 43 has been shown. However, without limitation thereto, a core piece not having the shoe portions 43, i.e., the core piece 40 having only the core-back portion 41 and the tooth portion 42, can also be manufactured in the same manner. In this case, the slot area 30 is an area surrounded by the core-back portion 41 and the tooth portion 42, surfaces forming the slot area 30 are the core-inner-circumferential surface 44 of the core-back portion 41 and the tooth side surface 45 of the tooth portion 42, and the stacked core can be formed or manufactured in the same manner as in the above embodiment 1.

In embodiment 1, the stacked core 50 divided for each tooth portion 42 in the circumferential direction 2 has been shown as an example of the stator core. However, without limitation thereto, as the stator core, both ends in the circumferential direction 2 of the core piece 40 shown in FIG. 6 and the stacked core 50 shown in FIG. 7 may be joined or connected with those of other core pieces 40 and other stacked cores 50. Also in this case, they can be formed or manufactured in the same manner as in the above embodiment 1.

The stator core of the rotating electric machine according to embodiment 1 configured as described above is a stacked core formed by stacking, in an axial direction, a plurality of core pieces each having a core-back portion and a tooth portion protruding toward an inner side in a radial direction from a core-inner-circumferential surface on the inner side in the radial direction of the core-back portion, wherein an adhesion portion is formed on the core pieces continuously or intermittently in the axial direction at a recess formed to extend in the axial direction on the core pieces on at least one of an end surface of an outer periphery of the tooth portion and an end surface of an outer periphery of the core-back portion of the stacked core.

Thus, the stacked core is formed by the core pieces being fixed in the axial direction by the adhesion portion at the recess formed on at least one of the end surface of the outer periphery of the tooth portion and the end surface of the outer periphery of the core-back portion, instead of an adhesive or swaging between stacked core pieces, whereby eddy current generated between the core pieces in the axial direction is reduced, so that loss can be reduced. In addition, assembly accuracy of the stator is stabilized and shape accuracy of the stator is improved, and thus, for example, torque ripple is reduced, so that rotating electric machine performance is improved. In a case where the number of the plurality of core pieces of the stacked core reaches several hundreds, it is not necessary to permeate an adhesive into all areas between the core pieces in the axial direction at several hundreds of locations, so that productivity is improved. Since an adhesive is not provided between the stacked core pieces, the space factor of the core pieces increases and thus the output density of the rotating electric machine increases. When the core-outer-circumferential surfaces of the core-back portions are shrink-fitted or press-fitted to the frame, there is no adhesive on the core-outer-circumferential surfaces of the core-back portions, and thus shape accuracy of the stator after assembly can be improved.

In the stator core of the rotating electric machine according to embodiment 1 configured as described above, the recess is formed to extend in the axial direction on all the core pieces on at least one of the end surface of the outer periphery of the tooth portion and the end surface of the outer periphery of the core-back portion of the stacked core, and the adhesion portion is formed at the recess on all the core pieces continuously or intermittently in the axial direction.

Thus, eddy current generated between the core pieces in the axial direction can be assuredly reduced and loss can be reduced.

In the stator core of the rotating electric machine according to embodiment 1 configured as described above, the adhesion portion formed at the recess is accommodated in the recess.

Thus, adhesion by the adhesion portion can be assuredly obtained.

In the stator core of the rotating electric machine according to embodiment 1 configured as described above, the recess that is a first recess is formed on all the core pieces on a core-outer-circumferential surface on an outer side in the radial direction of the core-back portion, which is the end surface of the outer periphery of the core-back portion.

Thus, eddy current generated between the core pieces in the axial direction can be assuredly reduced and loss can be reduced.

In the stator core of the rotating electric machine according to embodiment 1 configured as described above, the adhesion portion is formed on a bottom side opposite to an opening side on an outer periphery side in the recess, without being formed on the opening side.

Thus, the adhesion portion can be prevented from obstructing other parts.

The stator core of the rotating electric machine according to embodiment 1 configured as described above is a stacked core formed by stacking, in an axial direction, a plurality of core pieces each having a core-back portion and a tooth portion protruding toward an inner side in a radial direction from a core-inner-circumferential surface on the inner side in the radial direction of the core-back portion, wherein an adhesion portion is formed on all the core pieces continuously or intermittently in the axial direction on at least one of surfaces forming a slot area surrounded by the tooth portion and the core-back portion of the stacked core.

The stator core of the rotating electric machine according to embodiment 1 configured as described above is a stacked core formed by stacking, in an axial direction, a plurality of core pieces each having a core-back portion, a tooth portion protruding toward an inner side in a radial direction from a core-inner-circumferential surface on the inner side in the radial direction of the core-back portion, and shoe portions extending in a circumferential direction from an inner side end in the radial direction of the tooth portion, wherein an adhesion portion is formed on all the core pieces continuously or intermittently in the axial direction on at least one of surfaces forming a slot area surrounded by the tooth portion, the core-back portion, and the shoe portion of the stacked core.

In the stator of the rotating electric machine according to embodiment 1 configured as described above, an insulator is formed on the surfaces of the stacked core that form the slot area of the above stator core of the rotating electric machine, the adhesion portion is formed between the insulator and the stacked core without being adhered to the insulator, and a coil is formed in the slot area with the insulator interposed.

The rotating electric machine according to embodiment 1 configured as described above includes:

the above stator of the rotating electric machine; and a rotor provided so as to be opposed to the stator with a gap therebetween.

Thus, the stacked core is formed by the core pieces being fixed in the axial direction by the adhesion portion formed on the surfaces forming the slot area of the core pieces, instead of an adhesive or swaging between stacked core pieces, whereby eddy current generated between the core pieces in the axial direction is reduced, so that loss can be reduced. In addition, assembly accuracy of the stator is stabilized and shape accuracy of the stator is improved, and thus, for example, torque ripple is reduced, so that rotating electric machine performance is improved. In a case where the number of the plurality of core pieces of the stacked core reaches several hundreds, it is not necessary to permeate an adhesive into all areas between the core pieces in the axial direction at several hundreds of locations, so that productivity is improved. Since an adhesive is not provided between the stacked core pieces, the space factor of the core pieces increases and thus the output density of the rotating electric machine increases. When the core-outer-circumferential surfaces of the core-back portions are shrink-fitted or press-fitted to the frame, there is no adhesive on the core-outer-circumferential surfaces of the core-back portions, and thus shape accuracy of the stator after assembly can be improved.

In the stator core of the rotating electric machine according to embodiment 1 configured as described above, the stacked core is formed so as to be divided in a circumferential direction for each tooth portion.

When both ends in the circumferential direction of the divided stacked cores are brought into contact with each other and the stacked cores are arranged in an annular shape, adhesives are not adhered at both ends in the circumferential direction of each stacked core, and therefore assembly accuracy of the stator is stabilized and shape accuracy of the stator is improved. Thus, for example, torque ripple is reduced, so that rotating electric machine performance is improved.)

In the stator core of the rotating electric machine according to embodiment 1 configured as described above, in a case where the adhesion portion is formed on the surface of the core-back portion that forms the slot area, the recess that is a second recess is recessed toward an outer side in the radial direction and extends in the axial direction on the surface of the core-back portion that forms the slot area, and the adhesion portion is provided at the second recess.

Thus, since the adhesion portion is provided at the recess, the slot area is not narrowed, so that the space factor of the coil is increased and rotating electric machine efficiency is improved.

In the stator core of the rotating electric machine according to embodiment 1 configured as described above, the adhesion portion is formed by an adhesive of an ultraviolet-curing type which is cured by irradiation of an ultraviolet ray.

Thus, the stacked core can be fixed in a short time, whereby productivity is improved.

In the stator core of the rotating electric machine according to embodiment 1 configured as described above, the adhesion portion is formed by an anaerobic adhesive.

Thus, equipment for curing the adhesive is not needed, so that the cost is reduced.

In the stator core of the rotating electric machine according to embodiment 1 configured as described above, the adhesion portion is formed by an adhesive of a thermosetting type.

Thus, the heat resistance of the stacked core can be increased.

In the stator of the rotating electric machine according to embodiment 1 configured as described above, the insulator is formed by integral molding with the stacked core.

Thus, the stacked core can be firmly fixed.

In the stator core of the rotating electric machine according to embodiment 1 configured as described above, on the core piece on one end side in the axial direction of the stacked core, a projection projecting toward the one end side in the axial direction is formed.

The method for manufacturing the stator core of the rotating electric machine according to embodiment 1 configured as described above includes:

a stamping step of sequentially stamping the core pieces from a sheet material while forming the projection for once every predetermined number of the core pieces of the stacked core;

an alignment step of stacking and aligning the stamped core pieces in the axial direction;

an application step of applying an adhesive at the recess on all the core pieces continuously or intermittently in the axial direction;

a curing step of curing the adhesive; and a division step of dividing a plurality of the stacked cores adhered by the adhesive continuously in the axial direction, by cutting the adhesive at a position of the projection in the axial direction.

In the method for manufacturing the rotating electric machine according to embodiment 1 configured as described above, an insulator and a coil are provided to the stator core of the rotating electric machine manufactured by the above method for manufacturing the stator core of the rotating electric machine, to form a stator, and a rotor is provided so as to be opposed to the stator with a gap therebetween.

Thus, the stacked cores can be easily divided at the position of the core piece having the projection.

In the method for manufacturing the stator core of the rotating electric machine according to embodiment 1 configured as described above, in the application step, the adhesive is leveled at a position away from an application surface for the adhesive by a certain distance, after the adhesive is applied.

Thus, the thickness of the adhesive can be uniformed, whereby strength variation of the stacked core can be reduced.

In the method for manufacturing the stator core of the rotating electric machine according to embodiment 1 configured as described above, in the application step, the adhesive is applied while positioning between the stacked core and an application position of the adhesive is performed.

Thus, application position accuracy of the adhesive can be improved.

In the method for manufacturing the stator core of the rotating electric machine according to embodiment 1 configured as described above, in the application step, the certain distance from the application surface for the adhesive, at which the adhesive is leveled, is changeable to a predetermined distance.

Thus, by changing the certain distance in accordance with dimension variations in the stacked core, the outer-shape position of the adhesive can be kept constant, whereby strength variation of the stacked core can be reduced.

In the method for manufacturing the stator core of the rotating electric machine according to embodiment 1 configured as described above, a load for holding the stacked core between both sides in the axial direction is applied during a period from the application step to the curing step.

Thus, position variation in the axial direction of the stacked core can be suppressed.

In the method for manufacturing the stator core of the rotating electric machine according to embodiment 1 configured as described above, in the alignment step, alignment is performed by guiding a core-outer-circumferential surface on an outer side in the radial direction of the core-back portion and a distal-end surface on the inner side in the radial direction of the tooth portion.

Thus, it is possible to easily shift to the application step while aligning the stacked core without using the slot area in guiding.

In the method for manufacturing the stator core of the rotating electric machine according to embodiment 1 configured as described above, in the application step, the adhesive of an ultraviolet-curing type is used, and in the curing step, the adhesive is irradiated with an ultraviolet ray.

Thus, using the adhesive of an ultraviolet-curing type, the stacked core can be fixed in a short time, whereby productivity of the stacked core is improved.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

1 frame
10 stator
100 rotating electric machine
2 upper bracket
20 rotor
22 application device
220 dispenser control device
221 syringe
222 path portion
223 path portion
224 path portion
230 leveling surface
231 positioning portion
240 nozzle
3 lower bracket
30 slot area
301 electromagnetic steel sheet
302 die
303 first punch.
304 second punch
305 alignment guide
306 heater
307 adhesive
308 cutting device
31 first restriction portion
310 support portion
32 second restriction portion
33 coil
333 third restriction portion
34 insulator
381 insulator
382 insulator
381 insulator
392 insulator
4 bearing
40 core piece
400 projection
401 core side surface
41 core-back portion
410 projection
42 tooth portion
420 projection
43 shoe portion
44 core-inner-circumferential surface
45 tooth side surface
46 shoe-outer-circumferential surface
47 core-outer-circumferential surface
48 distal-end surface
5 bearing
50 stacked core
500 recess
501 adhesion portion
502 opening
6 rotary shaft
600 recess
601 adhesion portion
7 rotor core
741 recess
8 permanent magnet
9 adhesion portion
91 adhesion portion 92 adhesion portion
A ejection direction
D introduction direction
E perpendicular direction
F1 press load
F2 load
H1 distance
H2 distance
H3 distance
T gap
X radial direction
X1 cuter side
X2 Loner side
Y axial direction.
Y stacking direction
Y1 advancement direction
Z circumferential direction

The invention claimed is:

1. A stator core of a rotating electric machine, comprising:
a stacked core including a predetermined number of core pieces stacked, in an axial direction, each of the predetermined number of core pieces having a core-back portion and a tooth portion protruding toward an inner side in a radial direction from a core-inner-circumferential surface on the inner side in the radial direction of the core-back portion, wherein
one or more projection is formed on only one of the predetermined number of core pieces,
an adhesion portion is formed on all of the predetermined number of core pieces continuously or intermittently in the axial direction on at least one of an end surface of an outer periphery of the tooth portion or an end surface of an outer periphery of the core-back portion of the stacked core, and
one end in the axial direction of the adhesion portion is cut at a position of the one or more projection in the axial direction.

2. The stator core of the rotating electric machine according to claim 1, wherein the adhesion portion is formed on all the predetermined number of core pieces continuously or intermittently in the axial direction at a recess formed to extend in the axial direction on all the core pieces on at least one of the end surface of the outer periphery of the tooth portion or the end surface of the outer periphery of the core-back portion of the stacked core.

3. The stator core of the rotating electric machine according to claim 2, wherein
the recess is a first recess, and
the first recess is formed on all the core pieces on a core-outer-circumferential surface on an outer side in the radial direction of the core-back portion, which is the end surface of the outer periphery of the core-back portion.

4. The stator core of the rotating electric machine according to claim 2, wherein the stacked core is formed so as to be divided in a circumferential direction for each tooth portion.

5. The stator core of the rotating electric machine according to claim 2, wherein the adhesion portion is formed by one of an adhesive of an ultraviolet-curing type which is cured by irradiation of an ultraviolet ray, an anaerobic adhesive, and an adhesive of a thermosetting type.

6. The stator core of the rotating electric machine according to claim 2, wherein the adhesion portion formed at the recess is accommodated in the recess.

7. The stator core of the rotating electric machine according to claim 6, wherein the adhesion portion is formed only on a bottom side opposite to an opening side on an outer periphery side in the recess.

8. A method for manufacturing the stator core of the rotating electric machine according to claim 2, the method comprising:
sequentially stamping core pieces from a sheet material while forming the one or more projection once for every predetermined number of the core pieces;
stacking and aligning the stamped core pieces in the axial direction;
applying an adhesive at the recess on all the stacked core pieces continuously or intermittently in the axial direction;
curing the adhesive; and
dividing a plurality of the stacked core adhered by the adhesive continuously in the axial direction by cutting the adhesive at the position of the one or more projection in the axial direction.

9. The method for manufacturing the stator core of the rotating electric machine according to claim 8, further comprising applying a load for holding the stacked core between both sides in the axial direction during a period from the applying the adhesive to the curing the adhesive.

10. The method for manufacturing the stator core of the rotating electric machine according to claim 8, further comprising guiding a core-outer-circumferential surface on an outer side in the radial direction of the core-back portion and a distal-end surface on the inner side in the radial direction of the tooth portion.

11. The method for manufacturing the stator core of the rotating electric machine according to claim 8, wherein
the adhesive is an ultraviolet-curing type, and
the adhesive is irradiated with an ultraviolet ray.

12. A method, comprising:
providing an insulator and a coil to the stator core of the rotating electric machine manufactured by the method for manufacturing the stator core of the rotating electric machine according to claim 8, to form a stator, and
providing a rotor so as to be opposed to the stator with a gap therebetween.

13. The method for manufacturing the stator core of the rotating electric machine according to claim 8, further comprising leveling the adhesive at a position away from an application surface for the adhesive by a certain distance after the adhesive is applied.

14. The method for manufacturing the stator core of the rotating electric machine according to claim 13, wherein the adhesive is applied while positioning between the stacked core and an application position of the adhesive is performed.

15. The method for manufacturing the stator core of the rotating electric machine according to claim 13, wherein the certain distance from the application surface for the adhesive, at which the adhesive is leveled, is changeable to a predetermined distance.

16. The stator core of the rotating electric machine according to claim 2, wherein
the predetermined number of core pieces each have shoe portions extending in a circumferential direction from an inner side end in the radial direction of the tooth portion, and
the adhesion portion is formed on all the predetermined number of core pieces continuously or intermittently in the axial direction on at least one of surfaces forming a slot area surrounded by the tooth portion, the core-back portion, or the shoe portions of the stacked core.

17. The stator core of the rotating electric machine according to claim 16, wherein, in a case where the adhesion portion is formed on the at least one of surfaces of the core-back portion that forms the slot area, the recess is a second recess, and the second recess is recessed toward an outer side in the radial direction and extends in the axial direction on the surface of the core-back portion that forms the slot area, and the adhesion portion is provided at the second recess.

18. A stator, wherein an insulator is formed on the surfaces of the stacked core that form the slot area of the stator core of the rotating electric machine according to claim 17, the adhesion portion is formed between the insulator and the stacked core without being adhered to the insulator, and a coil is formed in the slot area with the insulator interposed.

19. The stator according to claim 18, wherein the insulator is formed by integral molding with the stacked core.

20. A rotating electric machine comprising:

the stator according to claim 18; and a rotor provided so as to be opposed to the stator with a gap therebetween.

* * * * *